United States Patent
Cole et al.

(10) Patent No.: US 11,256,215 B2
(45) Date of Patent: *Feb. 22, 2022

(54) DISPLAY SYSTEM

(71) Applicant: Dualitas Ltd, Milton Keynes (GB)

(72) Inventors: Alexander Cole, Milton Keynes (GB); Jamieson Christmas, Milton Keynes (GB)

(73) Assignee: DUALITAS LTD, Milton Keynes (GB)

( * ) Notice: Subject to any disclaimer, the term of this patent is extended or adjusted under 35 U.S.C. 154(b) by 317 days.

This patent is subject to a terminal disclaimer.

(21) Appl. No.: 16/112,153

(22) Filed: Aug. 24, 2018

(65) Prior Publication Data

US 2019/0064738 A1    Feb. 28, 2019

(30) Foreign Application Priority Data

Aug. 25, 2017    (GB) ..................................... 1713670

(51) Int. Cl.
*G03H 1/30* (2006.01)
*G03H 1/26* (2006.01)
(Continued)

(52) U.S. Cl.
CPC ................. *G03H 1/26* (2013.01); *G03H 1/30* (2013.01); *G03H 1/2294* (2013.01);
(Continued)

(58) Field of Classification Search
CPC .... G03H 1/26; G03H 1/30; G03H 2001/0224; G03H 1/2294; G03H 2222/18;
(Continued)

(56) References Cited

U.S. PATENT DOCUMENTS 5,729,364 A      3/1998  Bashaw et al.
10,514,658 B2 * 12/2019  Christmas ............ G03H 1/2294
                         (Continued)

FOREIGN PATENT DOCUMENTS

EP    1457974       9/2004
EP    3268816 B1    5/2019
                  (Continued)

OTHER PUBLICATIONS

Jutamulia et al. "Fourier transform property of lens based on geometrical optics" Proceedings of SPIE vol. 4929 pp. 80-85 (Year: 2002).*

(Continued)

*Primary Examiner* — George G. King
(74) *Attorney, Agent, or Firm* — McDonnell Boehnen Hulbert & Berghoff LLP

(57) ABSTRACT

A display system and a method of adjusting a display system are disclosed. A first plurality of pixels is arranged to display a first hologram, receive light of a first wavelength, and output spatially-modulated light according to the first hologram, along a first optical path. A first Fourier transform lens on the first optical path forms a first holographic reconstruction at a replay plane. A second plurality of pixels is arranged to display a second hologram, receive light of a second wavelength, and output spatially modulated light according to the second hologram, along a second optical path. A second Fourier transform lens on the second optical path forms a second holographic reconstruction at the replay plane. A first optical element on the first optical path is arranged to receive the output light from a first part of the first optical path and direct it along a second part of the first optical path to the replay plane. A second optical element on the second optical path is arranged to receive the output light of the second wavelength from a first part of the second (Continued)

optical path and direct it along a second part of the second optical path to the replay plane. The length of the first part of the first optical path is not equal to the length of the first part of the second optical path. The first part of the first optical path may he substantially collinear with the first part of the second optical path.

18 Claims, 10 Drawing Sheets

(51) Int. Cl.
 *G03H 1/22* (2006.01)
 *G03H 1/02* (2006.01)

(52) U.S. Cl.
 CPC ............... *G03H 2001/0224* (2013.01); *G03H 2001/2218* (2013.01); *G03H 2001/2271* (2013.01); *G03H 2001/266* (2013.01); *G03H 2001/303* (2013.01); *G03H 2222/18* (2013.01); *G03H 2223/17* (2013.01); *G03H 2223/24* (2013.01); *G03H 2225/52* (2013.01); *G03H 2225/60* (2013.01); *G03H 2225/61* (2013.01); *G03H 2226/02* (2013.01)

(58) Field of Classification Search
 CPC ....... G03H 2225/61; G03H 2001/2218; G03H 2223/24; G03H 2001/2271; G03H 2001/266; G03H 2001/303; G03H 2223/17; G03H 2225/52; G03H 2225/60; G03H 2226/02; G03H 1/2205; G03H 2225/12; G03H 2225/32; G03H 2225/31; G03H 2225/25; G03H 2225/22; G02B 27/0103; G02B 2027/0174
 USPC .......................................................... 359/24
 See application file for complete search history.

(56) References Cited

U.S. PATENT DOCUMENTS

| | | | |
|---|---|---|---|
| 2009/0219591 A1 | 9/2009 | Cable | |
| 2010/0315605 A1* | 12/2010 | Arita | G02B 26/0875 353/98 |
| 2013/0170007 A1* | 7/2013 | Kurashige | G02B 27/48 359/24 |
| 2013/0194644 A1 | 8/2013 | Cable et al. | |
| 2018/0120768 A1 | 5/2018 | Christmas | |
| 2019/0064738 A1 | 2/2019 | Cole et al. | |

FOREIGN PATENT DOCUMENTS

| | | |
|---|---|---|
| GB | 2496108 | 5/2013 |
| GB | 2498170 | 7/2013 |
| GB | 2501112 | 10/2013 |
| GB | 2518664 | 4/2015 |
| GB | 2547929 | 9/2017 |

OTHER PUBLICATIONS

By Yaraş et al. "Real-time phase-only color holographic video display system using LED illumination" Applied Optics / vol. 48, No. 34 / 1, pp. H48-H53 (Year: 2009).*
Takano K et al. Color Electro-Holographic Display Using a Single White Light and a Focal Adjustment Method, Opt. Eng. 41/10, 2002, pp. 2427-2433.
Examination Report dated Aug. 24, 2017 for Great Britain Application No. GB 1603703.8 filed Mar. 3, 2016, 3 pages.
International Search Report and Written Opinion for International Searching Authority dated May 15, 2017 for International Application No. PCT/GB2017/050585 filed Mar. 3, 2017, 13 pages.
Li et al., "Color holographic magnification system based on spatial light modulators," Journal of the SID 24/2, 2016, pp. 125-129.
Combined Search and Examination Report dated Jan. 26, 2017 for Great Britain 1603703 8 filed Mar. 3, 2016, 5 pages.
Great Britain Search and Examination Report dated Feb. 18, 2018 for GB Application No. 1713670.6, 7 pages.
Copending U.S. Appl. No. 15/565,828, filed Oct. 11, 2017.

* cited by examiner

DISPLAY SYSTEM

CROSS-REFERENCE TO RELATED APPLICATIONS

This application claims the benefit of priority under 35 U.S.C. 119 of United Kingdom Patent Application no, 1713670.6, which is hereby incorporated herein by reference in its entirety.

FIELD

The present disclosure relates to a display system. In particular, the present disclosure relates to a colour display system. The present disclosure also relates to a holographic projector and a colour holographic projector. The present disclosure further relates to a head-up display, head-mounted display and near-eye device.

BACKGROUND AND INTRODUCTION

Light scattered from an object contains both amplitude and phase information. This amplitude and phase information can be captured on, for example, a photosensitive plate by well-known interference techniques to form a holographic recording, or "hologram", comprising interference fringes. The hologram may be reconstructed by illumination with suitable light to form a two-dimensional or three-dimensional holographic reconstruction, or replay image, representative of the original object.

Computer-generated holography may numerically simulate the interference process. A computer-generated hologram, "CGH", may be calculated by a technique based on a mathematical transformation such as a Fresnel or Fourier transform. These types of holograms may be referred to as Fresnel or Fourier holograms. A Fourier hologram may be considered a Fourier domain representation of the object or a frequency domain representation of the object. A CGH may also be calculated by coherent ray tracing or a point cloud technique, for example.

A CGH may be encoded on a spatial light modulator, "SLM", arranged to modulate the amplitude and/or phase of incident light. Light modulation may be achieved using electrically-addressable liquid crystals, optically-addressable liquid crystals or micro-mirrors, for example.

The SLM may comprise a plurality of individually-addressable pixels which may also be referred to as cells or elements. The light modulation scheme may be binary, multilevel or continuous. Alternatively, the device may be continuous (i.e. is not comprised of pixels) and light modulation may therefore be continuous across the device. The SLM may be reflective meaning that modulated light is output from the SLM in reflection. The SLM may equally be transmissive meaning that modulated light is output from the SLM is transmission.

A holographic projector for imaging may be provided using the described technology. Such projectors have found application in head-up displays, "HUD", and head-mounted displays, "HMD", including near-eye devices, for example.

A colour 2D holographic reconstruction can he produced and there are two main methods of achieving this. One of these methods is known as "frame-sequential colour" (FSC). In an FSC system, three lasers are used (red, green and blue) and each laser is activated in succession at the SLM to produce each frame of the video. The colours are cycled (red, green, blue, red, green, blue, etc.) at a fast enough rate such that a human viewer sees a polychromatic image from a combination of the three lasers. Each hologram is therefore colour specific. For example, in a video at 25 frames per second, the first frame would be produced by firing the red laser for $1/75$th of a second, then the green laser would be fired for $1/75$th of a second, and finally the blue laser would be fired for $1/75$th of a second. The next frame would then be produced, starting with the red laser, and so on.

Another alternative method, that will be referred to as "spatially separated colours" (SSC) involves all three lasers being fired at the same time, but taking different optical paths, e.g. each using different SLMs or different spatial areas on the same SLM, and then combining to form the colour image.

An advantage of the SSC (spatially separated colours) method is that the image is brighter due to all three lasers being fired at the same time. However, if due to space limitations it is required to use only one SLM, the surface area of the SLM can be divided into three equal parts, acting in effect as three separate SLMs. The drawback of this is that the quality of each single-colour image is decreased, due to the decrease of SLM surface area available for each monochromatic image. The quality of the polychromatic image is therefore decreased accordingly. The decrease of SLM surface area available means that fewer pixels on the SLM can be used, thus reducing the quality of the image.

Holographic colour display systems suffer from a number of problems. One problem is a mismatch between the physical size of the different colour holographic reconstructions. Another problem is the composite colour image can be of low quality because of a resolution mismatch between the different colour holographic reconstructions. Yet another problem is that the number and/or arrangement of optical components needed to form a colour holographic display system requires a large amount of space, leading to a bulky system that is impractical for many applications, such as near-eye device applications.

The present disclosure addresses at least some of these problems.

An improved holographic projection system is disclosed herein, which takes the form of a display system.

SUMMARY

Aspects of the present disclosure are defined in the appended independent claims.

The term "hologram" is used to refer to the recording which contains amplitude and/or phase information about the object. The term "holographic reconstruction" is used to refer to the optical reconstruction of the object which is formed by illuminating the hologram. The term "replay plane" is used herein to refer to the plane in space where the holographic reconstruction is fully formed. The term "replay field" is used herein to refer to the sub-area of the replay plane which can receive spatially-modulated light from the spatial light modulator. The terms "replay image", "image" and "image region" refer to areas of the replay field illuminated by light forming the holographic reconstruction. In embodiments, the "image" may comprise discrete spots which may be referred to as "image pixels".

The terms "encoding", "writing" or "addressing" are used to describe the process of providing the plurality of pixels of the SLM with a respect plurality of control values which respectively determine the modulation level of each pixel. It may be said that the pixels of the SLM are configured to "display" a light modulation distribution in response to receiving the plurality of control values. Thus, the SLM may be said to "display" a hologram.

It has been found that a holographic reconstruction of acceptable quality can be formed from a "hologram" containing only phase information related to the original object. Such a holographic recording may be referred to as a phase-only hologram. Embodiments relate to a phase-only hologram but the present disclosure is equally applicable to amplitude-only holography.

The present disclosure is also equally applicable to forming a holographic reconstruction using amplitude and phase information related to the original object. In some embodiments, this is achieved by complex modulation using a so-called fully complex hologram which contains both amplitude and phase information related to the original object. Such a hologram may be referred to as a fully-complex hologram because the value (grey level) assigned to each pixel of the hologram has an amplitude and phase component. The value (grey level) assigned to each pixel may be represented as a complex number having both amplitude and phase components. In some embodiments, a fully-complex computer-generated hologram is calculated.

Reference may be made to the phase value, phase component, phase information or, simply, phase of pixels of the computer-generated hologram or the spatial light modulator as shorthand for "phase-delay". That is, any phase value described is, in fact, a number (e.g. in the range 0 to $2\pi$) which represents the amount of phase retardation provided by that pixel. For example, a pixel of the spatial light modulator described as having a phase value of $\pi/2$ will change the phase of received light by $\pi/2$ radians. in some embodiments, each pixel of the spatial light modulator is operable in one of a plurality of possible modulation values (e.g. phase delay values). The term "grey level" may be used to refer to the plurality of available modulation levels. For example, the term "grey level" may be used for convenience to refer to the plurality of available phase levels in a phase-only modulator even though different phase levels do not provide different shades of grey. The term "grey level" may also be used for convenience to refer to the plurality of available complex modulation levels in a complex modulator.

The present disclosure concerns a display system comprising two or more monochromatic colour channels. Each colour channel comprises a plurality of pixels arranged to display a hologram, and a Fourier transform lens arranged to form a holographic reconstruction of the hologram at a replay plane. Each holographic reconstruction is a monochromatic holographic reconstruction for the corresponding colour channel. Each colour channel has a corresponding optical path from the Fourier transform lens to the replay plane.

In embodiments, the display system is arranged to provide a colour display. A holographic reconstruction at the replay plane may combine the monochromatic holographic reconstructions for two or more colour channels. When the replay fields of the holographic reconstructions for the different colour channels are not coincident (i.e. the image pixels do not overlap), the image may comprise only the individual colours of the colour channels. When the replay fields of the holographic reconstructions for the different colour channels are coincident (i.e. the image pixels overlap) to form a composite colour holographic reconstruction, the image may comprise a spectrum of colours suitable for a full-colour display.

The present disclosure proposes display system configurations that provide different optical paths for the different colour channels. The present disclosure further proposes configurations that are space efficient (i.e., compact). The present disclosure further proposes configurations that enable adjustment of one or more of the optical paths for the different colour channels.

There is provided a display system comprises a first plurality of pixels arranged to display a first hologram. The first plurality of pixels is arranged to receive light of a first wavelength, and output light of the first wavelength, spatially-modulated according to the first hologram, along a first optical path. The first optical path has a first Fourier transform lens for forming a first holographic reconstruction, corresponding to the first hologram, at a replay plane. The display system further comprises a second plurality of pixels arranged to display a second hologram. The second plurality of pixels is arranged to receive light of a second wavelength, and output light of the second wavelength, spatially-modulated according to the second hologram, along a second optical path. The second optical path has a second Fourier transform lens, for forming a second holographic reconstruction, corresponding to the second hologram, at the replay plane. A first optical element, such as a first mirror, is on the first optical path between the first Fourier transform lens and the replay plane. The first optical element is arranged to receive the output/spatially modulated light of the first wavelength from a first part of the first optical path and direct the light of the first wavelength along a second part of the first optical path to the replay plane. A second optical element, such as a second mirror, is on the second optical path between the second Fourier transform lens and the replay plane. The second optical element is arranged to receive the output/spatially modulated light of the second wavelength from a first part of the second optical path and direct the light of the second wavelength along a second part of the second optical path to the replay plane. The length of the second optical path between the second Fourier transform lens and the replay plane is not equal to the length of the first optical path between the first Fourier transform lens and the replay plane. The length of the first part of the first optical path is not equal to, such as greater than, the length of the first part of the second optical path.

In some embodiments, the first part of the first optical path is substantially parallel or substantially collinear with the first part of the second optical path. In accordance with these embodiments, the first and second optical elements, which redirect the light of the corresponding colour channel from a first part to a second part of the corresponding optical paths, are positioned in alignment on the substantially collinear first part of the corresponding optical paths. This configuration enables adjustment of the first and second optical paths, by movement of one or more of the first and second optical elements, whilst maintaining the alignment therebetween. In particular, linear movement of the optical elements along the line or axis of the collinear first part of the optical paths, enables adjustment of the different lengths of the first and second optical paths from the Fourier transform lens to the replay plane. Tilting movement of the optical elements further enables adjustment of the direction of the second part of the corresponding optical path. In this way, the position and orientation of the first and second optical elements can be fine-tuned, so that the first and second holographic reconstructions can be more precisely matched at the replay plane.

The first and second optical elements may comprise first and second mirrors. Accordingly, the first and second mirrors reflect the light of the corresponding channel from the first part to the second part of the first and second optical paths, respectively. This enables the first and second plurality of pixels to be more closely located to the replay plane, thus enabling a more compact configuration. In addition, the use of mirrors as the optical elements enables the first and second optical paths, and optionally corresponding first and second light sources, to be located closer together, whilst, at the same time, being able to provide different length optical paths between the respective Fourier transform lens and the replay plane. Furthermore, the use of mirrors as the optical elements enables easier adjustment of the configuration, and thus facilitates fine-tuning of the colour channels at the replay plane.

The disclosure also provides methods for displaying images. In another aspect of the disclosure a method for displaying an image includes displaying a first hologram on a first plurality of pixels; receiving light of a first wavelength at the first plurality of pixels and outputting light of the first wavelength, spatially modulated according to the first hologram, along a first optical path; forming from the light of the first wavelength a first holographic reconstruction corresponding to the first hologram at a replay plane using a first Fourier transform lens, wherein the forming the first holographic reconstruction includes transmitting the light of the first wavelength from the first Fourier transform lens along a first part of the first optical path and directing it along a second part of the first optical path to the replay plane; displaying a second hologram on a second plurality of pixels; receiving light of a second wavelength at the second plurality of pixels and outputting light of the second wavelength, spatially modulated according to the second hologram, along a second optical path; and forming from the light of the second wavelength a second holographic reconstruction corresponding to the second hologram at the replay plane using a second Fourier transform lens, wherein the forming the second holographic reconstruction includes transmitting the light of the second wavelength from the second Fourier transform lens along a first part of the second optical path and directing it along a second part of the second optical path to the replay plane, wherein the length of the second optical path between the second Fourier transform lens and the replay plane is not equal to the length of the first optical path between the first Fourier transform lens and the replay plane, and wherein the length of the first part of the first optical path is not equal to the length of the first part of the second optical path. The direction of the light of the first wavelength can, for example, be performed with a first optical element, e.g., with a first mirror, and the direction of the light of the second wavelength can, for example, be performed with a second optical element, e.g., a second mirror. In certain such embodiments, the second optical element receives a substantially collinear first part of the first and second optical paths, and transmits the light of the first wavelength along the first optical path to the first optical element, whilst directing the light of the second wavelength along the second part of the second optical path.

In certain such embodiments, the direction of the light of the first wavelength and the direction of the light of the second wavelength are performed so that the second holographic reconstruction matches the first holographic reconstruction. For example, in certain embodiments, the method further includes adjusting the position of the first optical element, to form the first holographic reconstruction at the replay plane, comprising linear movement of the first optical element towards or away from the first plurality of pixels along an axis substantially parallel to the first part of the first optical path; adjusting the position of the second optical element to form the second holographic reconstruction at the replay plane, comprising linear movement of the second optical element towards or away from the second plurality of pixels along an axis substantially parallel to the first part of the second optical path so that the second holographic reconstruction matches the first holographic reconstruction. The methods can further include adjusting the orientation of one or more of the first and second optical elements.

The methods described herein can further use a third wavelength of light, for example, by displaying a third hologram on a third plurality of pixels; receiving light of a third wavelength at the third plurality of pixels and outputting light of the third wavelength, spatially modulated according to the third hologram, along a third optical path; and forming from the light of the third wavelength a third holographic reconstruction corresponding to the third hologram at a replay plane using a third Fourier transform lens, wherein the forming the third holographic reconstruction includes transmitting the light of the third wavelength from the third Fourier transform lens along a first part of the third optical path and directing it along a second part of the third optical path to the replay plane; wherein the length of the third optical path between the third Fourier transform lens and the replay plane is not equal to the length of the first optical path between the first Fourier transform lens and the replay plane and/or is not equal to the second optical path between the second Fourier transform lens and the replay plane, and wherein the length of the first part of the third optical path is not equal to the length of the first part of the second optical path and/or the first part of the first optical path. The direction of the light of the first wavelength can, for example, be performed with a first optical element, e.g., with a first mirror, the direction of the light of the second wavelength can, for example, be performed with a second optical element, e.g., a second mirror, and the direction of the light of the third wavelength can, for example, be performed with a third optical element, e.g., a third mirror. In certain such embodiments, the second optical element receives a substantially collinear first part of the first and second optical paths, and transmits the light of the first wavelength along the first optical path to the first optical element, whilst directing the light of the second wavelength along the second part of the second optical path; and the third optical element receives a substantially collinear first part of the first, second and third optical paths, and transmits the light of the first wavelength along the first optical path to the first optical element and transmits the light of the second wavelength along the second optical path to the second optical element, whilst directing the light of the third wavelength along the second part of the third optical path.

In certain such embodiments, the direction of the light of the first wavelength, the direction of the light of the second wavelength and the direction of the light of the third wavelength are performed so that the third holographic reconstruction matches the second holographic reconstruction and the first holographic reconstruction. For example, in certain embodiments, the method further includes adjusting the position of the first optical element, to form the first holographic reconstruction at the replay plane, comprising linear movement of the first optical element towards or away from the first plurality of pixels along an axis substantially parallel to the first part of the first optical path; adjusting the position of the second optical element to form the second holographic reconstruction at the replay plane, comprising linear movement of the second optical element towards or away from the second plurality of pixels along an axis substantially parallel to the first part of the second optical path so that the second holographic reconstruction matches the first holographic reconstruction; and adjusting the position of the third optical element to form the third holographic reconstruction at the replay plane, comprising linear movement of the third optical element towards or away from the third plurality of pixels along an axis substantially parallel to the first part of the third optical path so that the third holographic reconstruction matches the first and second holographic reconstructions. The methods can further include adjusting the orientation of one or more of the first, second and third optical elements.

The methods of the disclosure can further be performed as described in more detail below with reference to the systems of the disclosure.

Although different embodiments and groups of embodiments may be disclosed separately in the detailed description which follows, any feature of any embodiment or group of embodiments may be combined with any other feature or combination of features of any embodiment or group of embodiments. That is, all possible combinations and permutations of features disclosed in the present disclosure are envisaged.

BRIEF DESCRIPTION OF THE DRAWINGS

Specific embodiments are described by way of example only with reference to the following figures.

The same reference numbers will be used throughout the drawings to refer to the same or like parts.

DETAILED DESCRIPTION OF EMBODIMENTS

The present invention is not restricted to the embodiments described in the following but extends to the full scope of the appended claims. That is, the present invention may be embodied in different forms and should not be construed as limited to the described embodiments, which are set out for the purpose of illustration.

Terms of a singular form may include plural forms unless specified otherwise.

A structure described as being formed at an upper portion/lower portion of another structure or on/under the other structure should be construed as including a case where the structures contact each other and, moreover, a case where a third structure is disposed there between.

In describing a time relationship—for example, when the temporal order of events is described as "after", "subsequent", "next", "before" or suchlike—the present disclosure should be taken to include continuous and non-continuous events unless otherwise specified. For example, the description should be taken to include a case which is not continuous unless wording such as "just", "immediate" or "direct" is used.

Although the terms "first", "second", etc. may be used herein to describe various elements, these elements are not limited by these terms. These terms are only used to distinguish one element from another. For example, a first element could be termed a second element, and, similarly, a second element could be termed a first element, without departing from the scope of the appended claims.

Features of different embodiments may be partially or overall coupled to or combined with each other, and may be variously inter-operated with each other. Some embodiments may be carried out independently from each other, or may be carried out together in co-dependent relationship.

Optical Configuration

Figure 1:
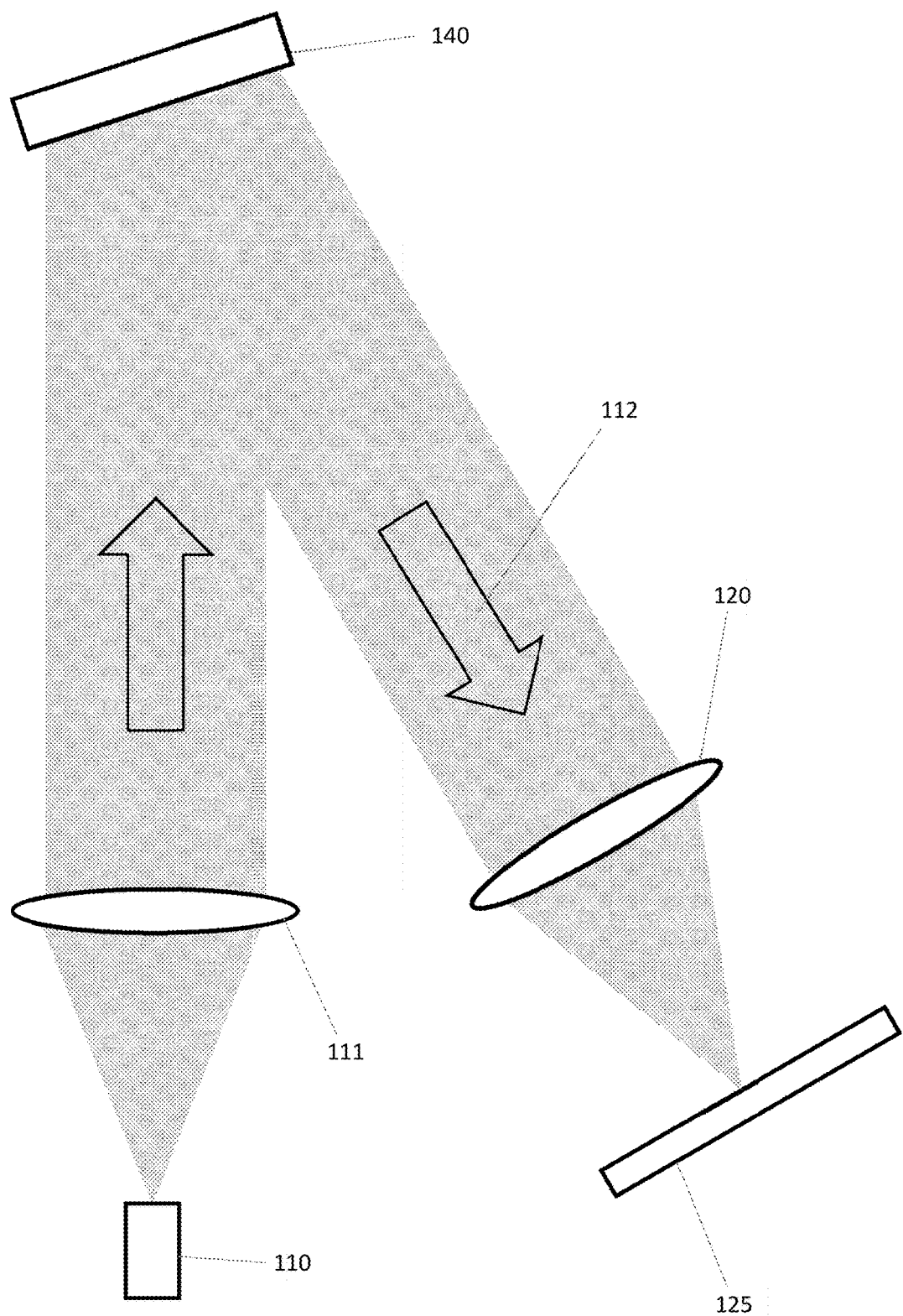
FIG. 1 is a schematic showing a reflective SLM producing a holographic reconstruction on a screen.

FIG. 1 shows an embodiment in which a computer-generated hologram is encoded on a single spatial light modulator. The computer-generated hologram is a Fourier transform of the object for reconstruction. It may therefore be said that the hologram is a Fourier domain or frequency domain or spectral domain representation of the object. In this embodiment, the spatial light modulator is a reflective liquid crystal on silicon, "LCOS", device. The hologram is encoded on the spatial light modulator and a holographic reconstruction is formed at a replay field, for example, a light receiving surface such as a screen or diffuser.

A light source 110, for example a laser or laser diode, is disposed to illuminate the SLM 140 via a collimating lens 111. The collimating lens causes a generally planar wavefront of light to be incident on the SLM. In FIG. 1, the direction of the wavefront is off-normal (e.g. two or three degrees away from being truly orthogonal to the plane of the transparent layer). However, in other embodiments, the generally planar wavefront is provided at normal incidence and a beam splitter arrangement is used to separate the input and output optical paths. In the embodiment shown in FIG. 1, the arrangement is such that light from the light source is reflected off a mirrored rear surface of the SLM and interacts with a light-modulating layer to form an exit wavefront 112. The exit wavefront 112 is applied to optics including a Fourier transform lens 120, having its focus at a screen 125. More specifically, the Fourier transform lens 120 receives a beam of modulated light from the SLM 140 and performs a frequency-space transformation to produce a holographic reconstruction at the screen 125.

Notably, in this type of holography, each pixel of the hologram contributes to the whole reconstruction. There is not a one-to-one correlation between specific points (or image pixels) on the replay field and specific light-modulating elements (or hologram pixels). In other words, modulated light exiting the light-modulating layer is distributed across the replay field.

In these embodiments, the position of the holographic reconstruction in space is determined by the dioptric (focusing) power of the Fourier transform lens. In the embodiment shown in FIG. 1, the Fourier transform lens is a physical lens. That is, the Fourier transform lens is an optical Fourier transform lens and the Fourier transform is performed optically. Any lens can act as a Fourier transform lens but the performance of the lens will limit the accuracy of the Fourier transform it performs. The skilled person understands how to use a lens to perform an optical Fourier transform.

Hologram Calculation

In some embodiments, the computer-generated hologram is a Fourier transform hologram, or simply a Fourier hologram or Fourier-based hologram, in which an image is reconstructed in the far field by utilising the Fourier transforming properties of a positive lens. The Fourier hologram is calculated by Fourier transforming the desired light field in the replay plane back to the lens plane. Computer-generated Fourier holograms may be calculated using Fourier transforms, A Fourier transform hologram may be calculated using an algorithm such as the Gerchberg-Saxton algorithm. Furthermore, the Gerchberg-Saxton algorithm may be used to calculate a hologram in the Fourier domain (i.e. a Fourier transform hologram) from amplitude-only information in the spatial domain (such as a photograph). The phase information related to the object is effectively "retrieved" from the amplitude-only information in the spatial domain. In some embodiments, a computer-generated hologram is calculated from amplitude-only information using the Gerchberg-Saxton algorithm or a variation thereof.

The Gerchberg Saxton algorithm considers the situation when intensity cross-sections of a light beam, $I_A(x, y)$ and $I_B(x, y)$, in the planes A and B respectively, are known and $I_A(x, y)$ and $I_B(x, y)$ are related by a single Fourier transform. With the given intensity cross-sections, an approximation to the phase distribution in the planes A and B, $\psi_A(x, y)$ and $\psi_B(x, y)$ respectively, is found. The Gerchberg-Saxton algorithm finds solutions to this problem by following an iterative process. More specifically, the Gerchberg-Saxton algorithm iteratively applies spatial and spectral constraints while repeatedly transferring a data set (amplitude and phase), representative of $I_A(x, y)$ and $I_B(x, y)$, between the spatial domain and the Fourier (spectral or frequency)) domain. The corresponding computer-generated hologram in the spectral domain is obtained through at least one iteration of the algorithm. The algorithm is convergent and arranged to produce a hologram representing an input image. The hologram may be an amplitude-only hologram, a phase-only hologram or a fully complex hologram.

In some embodiments, a phase-only hologram is calculated using an algorithm based on the Gerchberg-Saxton algorithm such as described in British patent 2,498,170 or 2,501,112 which are hereby incorporated in their entirety by reference. However, embodiments disclosed herein describe calculating a phase-only hologram by way of example only. In these embodiments, the Gerchberg-Saxton algorithm retrieves the phase information $\psi[u, v]$ of the Fourier transform of the data set which gives rise to a known amplitude information T[x, y], wherein the amplitude information T[x, y] is representative of a target image (e.g. a photograph). Since the magnitude and phase are intrinsically combined in the Fourier transform, the transformed magnitude and phase contain useful information about the accuracy of the calculated data set. Thus, the algorithm may be used iteratively with feedback on both the amplitude and the phase information. However, in these embodiments, only the phase information $\psi[u, v]$ is used as the hologram to form a holographic representative of the target image at an image plane. The hologram is a data set (e.g. 2D array) of phase values.

In other embodiments, an algorithm based on the Gerchberg-Saxton algorithm is used to calculate a fully-complex hologram. A fully-complex hologram is a hologram having a magnitude component and a phase component. The hologram is a data set (e.g. 2D array) comprising an array of complex data values wherein each complex data value comprises a magnitude component and a phase component.

In some embodiments, the algorithm processes complex data and the Fourier transforms are complex Fourier transforms. Complex data may be considered as comprising (i) a real component and an imaginary component or (ii) a magnitude component and a phase component. In some embodiments, the two components of the complex data are processed differently at various stages of the algorithm.

Figure 2A:
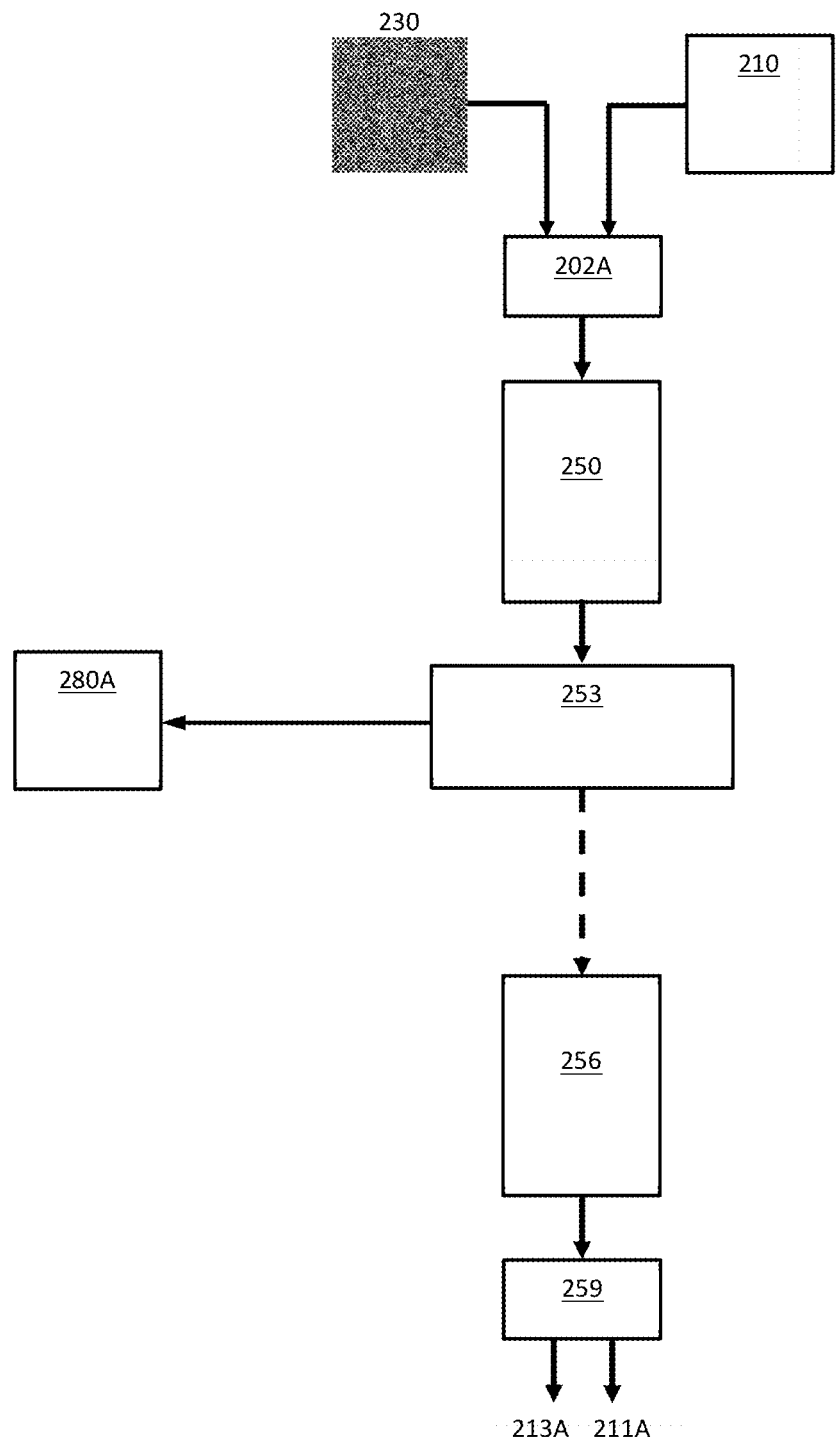
FIG. 2A illustrates a first iteration of an example Gerchberg-Saxton type algorithm.

FIG. 2A illustrates the first iteration of an algorithm in accordance with some embodiments for calculating a phase-only hologram. The input to the algorithm is an input image 210 comprising a 2D array of pixels or data values, wherein each pixel or data value is a magnitude, or amplitude, value. That is, each pixel or data value of the input image 210 does not have a phase component. The input image 210 may therefore be considered a magnitude-only or amplitude-only or intensity-only distribution. An example of such an input image 210 is a photograph or one frame of video comprising a temporal sequence of frames. The first iteration of the algorithm starts with a data forming step 202A comprising assigning a random phase value to each pixel of the input image, using a random phase distribution (or random phase seed) 230, to form a starting complex data set wherein each data element of the set comprising magnitude and phase. It may be said that the starting complex data set is representative of the input image in the spatial domain.

First processing block 250 receives the starting complex data set and performs a complex Fourier transform to form a Fourier transformed complex data set. Second processing block 253 receives the Fourier transformed complex data set and extracts the set of phase values. The second processing block 253 quantises each phase value to form hologram 280A. Each phase value is quantised in accordance with the phase-levels which may be represented on the pixels of the spatial light modulator which will be used to "display" the hologram. For example, if each pixel of the spatial light modulator provides 256 different phase levels, each phase value of the hologram is quantised into one phase level of the 256 possible phase levels. Hologram 280A is a phase-only Fourier hologram which is representative of an input image. It may be said that hologram 280A is representative of the input image in the spectral or Fourier or frequency domain. In some embodiments, the algorithm stops at this point.

However, in other embodiments, the algorithm continues as represented by the dotted arrow in FIG. 2A. In other words, the steps which follow the dotted arrow in FIG. 2A are optional (i.e. not essential to all embodiments). If the algorithm continues, second processing block 253 additionally replaces the magnitude values of the Fourier transformed complex data set with new magnitude values. The new magnitude values are a distribution of values representative of the magnitude distribution of the light pattern which will be used to illuminate the spatial light modulator. In some embodiments, each new magnitude value is unity. In other embodiments, second processing block 253 processes the magnitude values of the second complex data set for example, performs a mathematical operation or series of mathematical operations on each magnitude value—to form the new magnitude values. Second processing block 253 outputs a complex data set comprising the quantised phase values and the new magnitude values.

Third processing block 256 receives the complex data set output by the second processing block 253 and performs an inverse Fourier transform to form an inverse Fourier transformed complex data set. It may be said that the inverse Fourier transformed complex data set is representative of the input image in the spatial domain.

Fourth processing block 259 receives the inverse Fourier transformed complex data set and extracts the distribution of magnitude values 211A and the distribution of phase values 213A. Optionally, the fourth processing block 259 assesses the distribution of magnitude values 211A. Specifically, the fourth processing block 259 may compare the distribution of magnitude values 211A of the inverse Fourier transformed complex data set with the input image 510 which is itself, of course, a distribution of magnitude values. If the difference between the distribution of magnitude values 211A and the input image 210 is sufficiently small, the fourth processing block 259 may determine that the hologram 280A is acceptable. That is, if the difference between the distribution of magnitude values 211A and the input image 210 is sufficiently small, the fourth processing block 259 may determine that the hologram 280A is a sufficiently-accurate representative of the input image 210. In some embodiments, the distribution of phase values 213A of the inverse Fourier transformed complex data set is ignored for the purpose of the comparison. It will be appreciated that any number of different methods for comparing the distribution of magnitude values 211A and the input image 210 may be employed and the present disclosure is not limited to any particular method. In some embodiments, a mean square difference is calculated and if the mean square difference is less than a threshold value, the hologram 280A is deemed acceptable. If the fourth processing block 259 determines that the hologram 280A is not acceptable, a further iteration of the algorithm may be performed. However, this comparison step is not essential and in other embodiments, the number of iterations of the algorithm performed is predetermined or preset or user-defined.

Figure 2B:
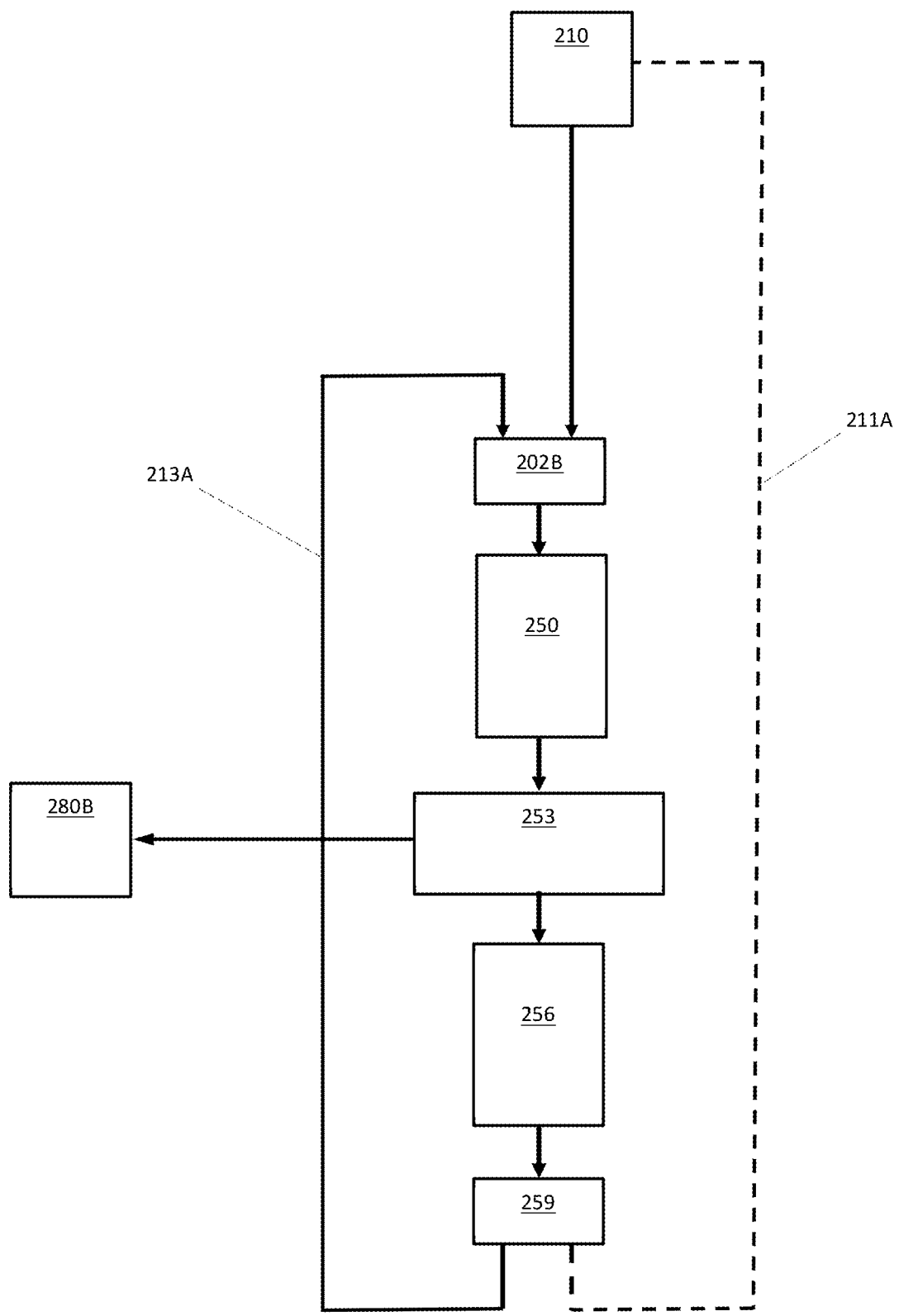
FIG. 2B illustrates the second and subsequent iterations of the example Gerchberg-Saxton type algorithm.

FIG. 2B represents a second iteration of the algorithm and any further iterations of the algorithm. The distribution of phase values 213A of the preceding iteration is fed-back through the processing blocks of the algorithm. The distribution of magnitude values 211A is rejected in favour of the distribution of magnitude values of the input image 210. In the first iteration, the data forming step 202A formed the first complex data set by combining distribution of magnitude values of the input image 210 with a random phase distribution 230. However, in the second and subsequent iterations, the data forming step 202B comprises forming a complex data set by combining (i) the distribution of phase values 213A from the previous iteration of the algorithm with (ii) the distribution of magnitude values of the input image 210.

The complex data set formed by the data forming step 202B of FIG. 2B is then processed in the same way described with reference to FIG. 2A to form second iteration hologram 280B. The explanation of the process is not therefore repeated here. The algorithm may stop when the second iteration hologram 280B has been calculated. However, any number of further iterations of the algorithm may be performed. It will be understood that the third processing block 256 is only required if the fourth processing block 259 is required or a further iteration is required. The output hologram 280B generally gets better with each iteration. However, in practice, a point is usually reached at which no measurable improvement is observed or the positive benefit of performing a further iteration is out-weighted by the negative effect of additional processing time. Hence, the algorithm is described as iterative and convergent.

Figure 2C:
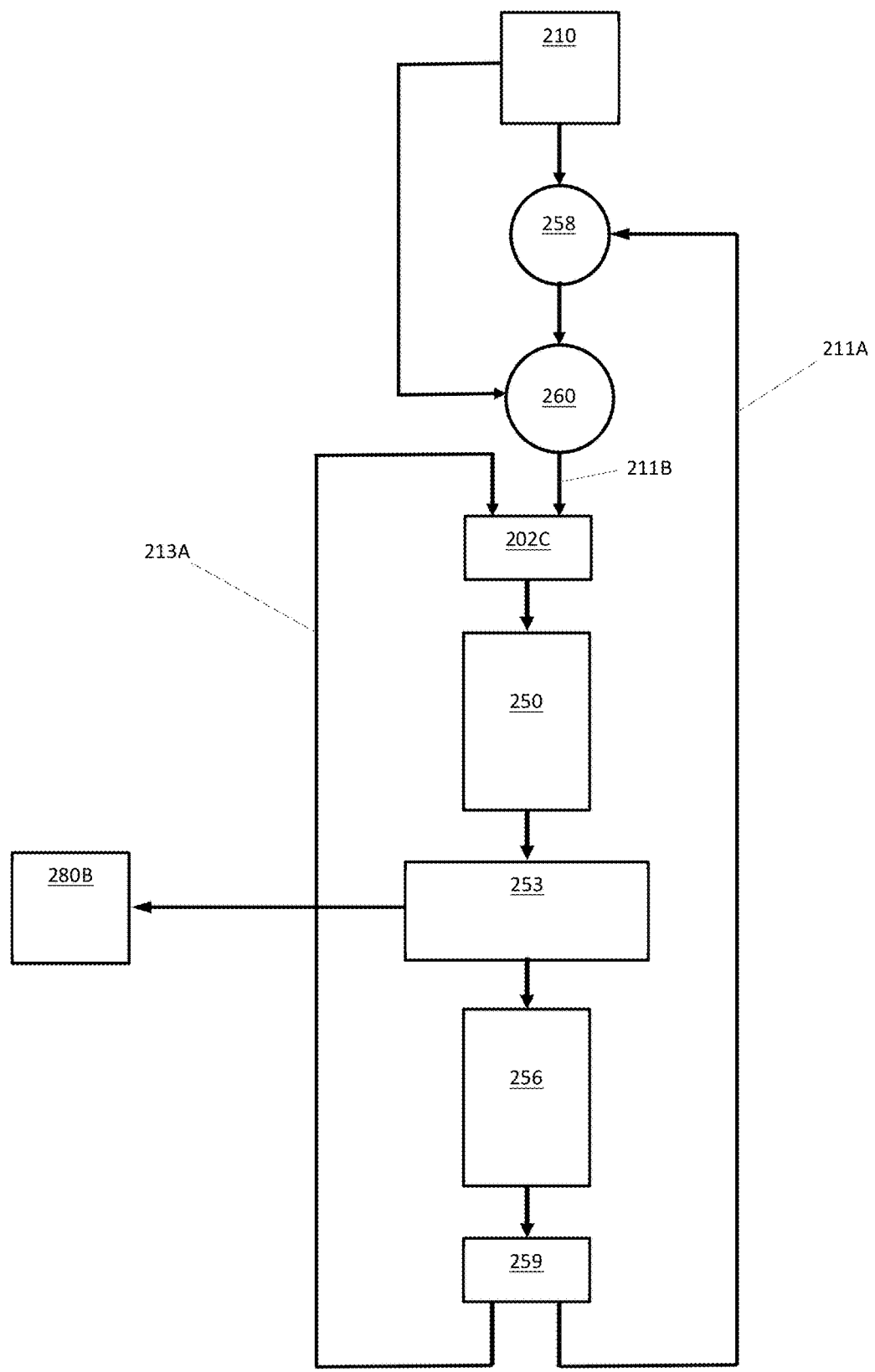
FIG. 2C illustrates alternative second and subsequent iterations of the example Gerchberg-Saxton type algorithm.

FIG. 2C represents an alternative embodiment of the second and subsequent iterations. The distribution of phase values 213A of the preceding iteration is fed-back through the processing blocks of the algorithm. The distribution of magnitude values 211A is rejected in favour of an alternative distribution of magnitude values. In this alternative embodiment, the alternative distribution of magnitude values is derived from the distribution of magnitude values 211 of the previous iteration. Specifically, processing block 258 subtracts the distribution of magnitude values of the input image 210 from the distribution of magnitude values 211 of the previous iteration, scales that difference by a gain factor α and subtracts the scaled difference from the input image 210. This is expressed mathematically by the following equations, wherein the subscript text and numbers indicate the iteration number:

$$R_{n+1}[x, y] = F'\{\exp(i\Psi_n[u, v])\}$$

$$\Psi_n[u, v] = \angle F\{\eta \cdot \exp(i\angle R_n[x, y])\}$$

$$\eta = T[x, y] - \alpha(|R_n[x, y]| - T[x, y])$$

where:
F' is the inverse Fourier transform;
F is the forward Fourier transform;
R[x, y] is the complex data set output by the third processing block 256;
T[x, y] is the input or target image;
∠ is the phase component;
ψ is the phase-only hologram 280B;
η is the new distribution of magnitude values 211B; and
α is the gain factor.

The gain factor a may be fixed or variable. In some embodiments, the gain factor α is determined based on the size and rate of the incoming target image data. In some embodiments, the gain factor α is dependent on the iteration number. In some embodiments, the gain factor α is solely function of the iteration number.

The embodiment of FIG. 2C is the same as that of FIG. 2A and FIG. 2B in all other respects. It may be said that the phase-only hologram ψ(u, v) comprises a phase distribution in the frequency or Fourier domain.

In some embodiments, the Fourier transform is performed computationally by including lensing data in the holographic data. That is, the hologram includes data representative of a lens as well as data representing the object. In these embodiments, the physical Fourier transform lens 120 of FIG. 1 is omitted. it is known in the field of computer-generated hologram how to calculate holographic data representative of a lens. The holographic data representative of a lens may be referred to as a software lens. For example, a phase-only holographic lens may be formed by calculating the phase delay caused by each point of the lens owing to its refractive index and spatially-variant optical path length. For example, the optical path length at the centre of a convex lens is greater than the optical path length at the edges of the lens. An amplitude-only holographic lens may be formed by a Fresnel zone plate. It is also known in the art of computer-generated hologram how to combine holographic data representative of a lens with holographic data representative of the object so that a Fourier transform can be performed without the need for a physical Fourier lens. In some embodiments, lensing data is combined with the holographic data by simple vector addition. In some embodiments, a physical lens is used in conjunction with a software lens to perform the Fourier transform. Alternatively, in other embodiments, the Fourier transform lens is omitted altogether such that the holographic reconstruction takes place in the far-field. In further embodiments, the hologram may include grating data—that is, data arranged to perform the function of a grating such as beam steering. Again, it is known in the field of computer-generated hologram how to calculate such holographic data and combine it with holographic data representative of the object. For example, a phase-only holographic grating may be formed by modelling the phase delay caused by each point on the surface of a blazed grating. An amplitude-only holographic grating may be simply superimposed on an amplitude-only hologram representative of an object to provide angular redirection of an amplitude-only hologram.

In some embodiments, there is provided a real-time engine arranged to receive image data and calculate holograms in real-time using the algorithm. In some embodiments, the image data is a video comprising a sequence of image frames. In other embodiments, the holograms are pre-calculated, stored in computer memory and recalled as needed for display on a SLM. That is, in some embodiments, there is provided a repository of predetermined holograms.

Embodiments relate to Fourier holography and Gerchberg-Saxton type algorithms by way of example only. The present disclosure is equally applicable to Fresnel holography and holograms calculated by other techniques such as those based on point cloud methods.

Light Modulation

A spatial light modulator may be used to display the computer-generated hologram. If the hologram is a phase-only hologram, a spatial light modulator which modulates phase is required. If the hologram is a fully-complex hologram, a spatial light modulator which modulates phase and amplitude may be used or a first spatial light modulator which modulates phase and a second spatial light modulator which modulates amplitude may be used.

In some embodiments, the light-modulating elements (i.e. the pixels) of the spatial light modulator are cells containing liquid crystal. That is, in some embodiments, the spatial light modulator is a liquid crystal device in which the optically-active component is the liquid crystal. Each liquid crystal cell is configured to selectively-provide a plurality of light modulation levels. That is, each liquid crystal cell is configured at any one time to operate at one light modulation level selected from a plurality of possible light modulation levels. Each liquid crystal cell is dynamically-reconfigurable to a different light modulation level from the plurality of light modulation levels. In some embodiments, the spatial light modulator is a reflective liquid crystal on silicon (LCOS) spatial light modulator but the present disclosure is not restricted to this type of spatial light modulator.

A LCOS device provides a dense array of light modulating elements, or pixels, within a small aperture (e.g. a few centimeters in width). The pixels are typically approximately 10 microns or less which results in a diffraction angle of a few degrees meaning that the optical system can be compact. It is easier to adequately illuminate the small aperture of a LCOS SLM than it is the larger aperture of other liquid crystal devices. An LCOS device is typically reflective which means that the circuitry which drives the pixels of a LCOS SLM can be buried under the reflective surface. The results in a higher aperture ratio. In other words, the pixels are closely packed meaning there is very little dead space between the pixels. This is advantageous because it reduces the optical noise in the replay field. A LCOS SLM uses a silicon backplane which has the advantage that the pixels are optically flat. This is particularly important for a phase modulating device.

Figure 3:
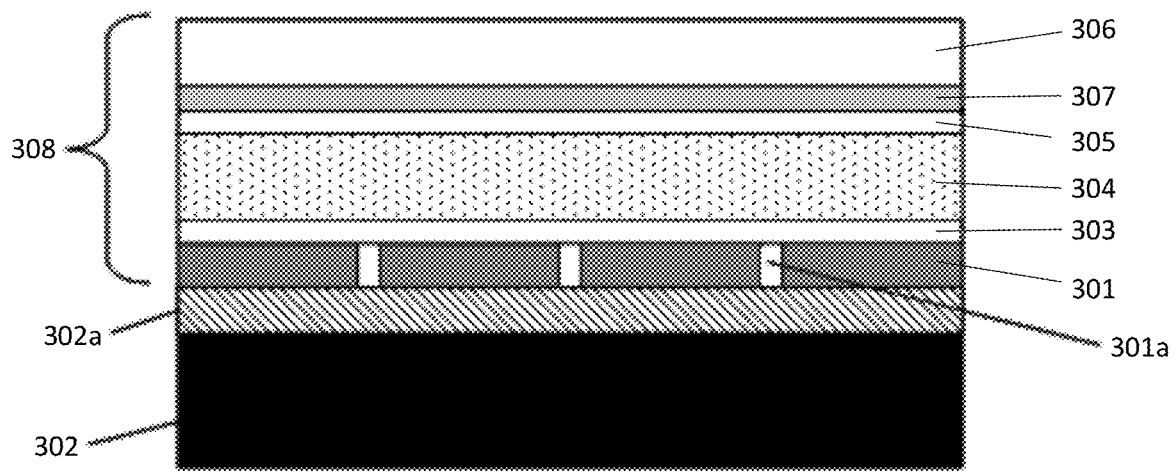
FIG. 3 is a schematic of a reflective LCOS SLM.

A suitable LCOS SLM is described below, by way of example only, with reference to FIG. 3. An LCOS device is formed using a single crystal silicon substrate 302. It has a 2D array of square planar aluminium electrodes 301, spaced apart by a gap 301a, arranged on the upper surface of the substrate. Each of the electrodes 301 can be addressed via circuitry 302a buried in the substrate 302. Each of the electrodes forms a respective planar mirror. An alignment layer 303 is disposed on the array of electrodes, and a liquid crystal layer 304 is disposed on the alignment layer 303. A second alignment layer 305 is disposed on the liquid crystal layer 304 and a planar transparent layer 306, e.g. of glass, is disposed on the second alignment layer 305. A single transparent electrode 307 e.g. of ITO is disposed between the transparent layer 306 and the second alignment layer 305.

Each of the square electrodes 301 defines, together with the overlying region of the transparent electrode 307 and the intervening liquid crystal material, a controllable phase-modulating element 308, often referred to as a pixel. The effective pixel area, or fill factor, is the percentage of the total pixel which is optically active, taking into account the space between pixels 301a. By control of the voltage applied to each electrode 301 with respect to the transparent electrode 307, the properties of the liquid crystal material of the respective phase modulating element may be varied, thereby to provide a variable delay to light incident thereon. The effect is to provide phase-only modulation to the wavefront, i.e. no amplitude effect occurs.

The described LCOS SLM outputs spatially modulated light in reflection. Reflective LCOS SLMs have the advantage that the signal lines, gate lines and transistors are below the mirrored surface, which results in high fill factors (typically greater than 90%) and high resolutions. Another advantage of using a reflective LCOS spatial light modulator is that the liquid crystal layer can be half the thickness than would be necessary if a transmissive device were used. This greatly improves the switching speed of the liquid crystal (a key advantage for the projection of moving video images). However, the teachings of the present disclosure may equally be implemented using a transmissive LCOS SLM.

Fourier Path Length

The so-called "Fourier path length" is the optical path length from the Fourier transform lens to the corresponding holographic reconstruction. The size of the holographic reconstruction, I, is related to the Fourier path length as follows:

$$I[x, y] = 2 \cdot f \cdot \tan\left(\sin^{-1}\left(\frac{\lambda}{2 \cdot p[x, y]}\right)\right) \quad (1)$$

where f is the Fourier path length, $\lambda$ is the wavelength of the light and p is the size of the pixel on the SLM.

It may therefore be understood that for any given Fourier path length and spatial light modulator pixel size, differing hologram reconstruction sizes will result for different colours. For example:

f=300 mm
Red ($\lambda r$)=640 nm
Green ($\lambda g$)=532 nm
Blue ($\lambda b$)=450 nm
p[x,y]=8 um This gives rise to three different sized hologram reconstructions:

Red=24.02 mm,
Green=19.96 mm, and
Blue=16.88 mm.

Figure 4:
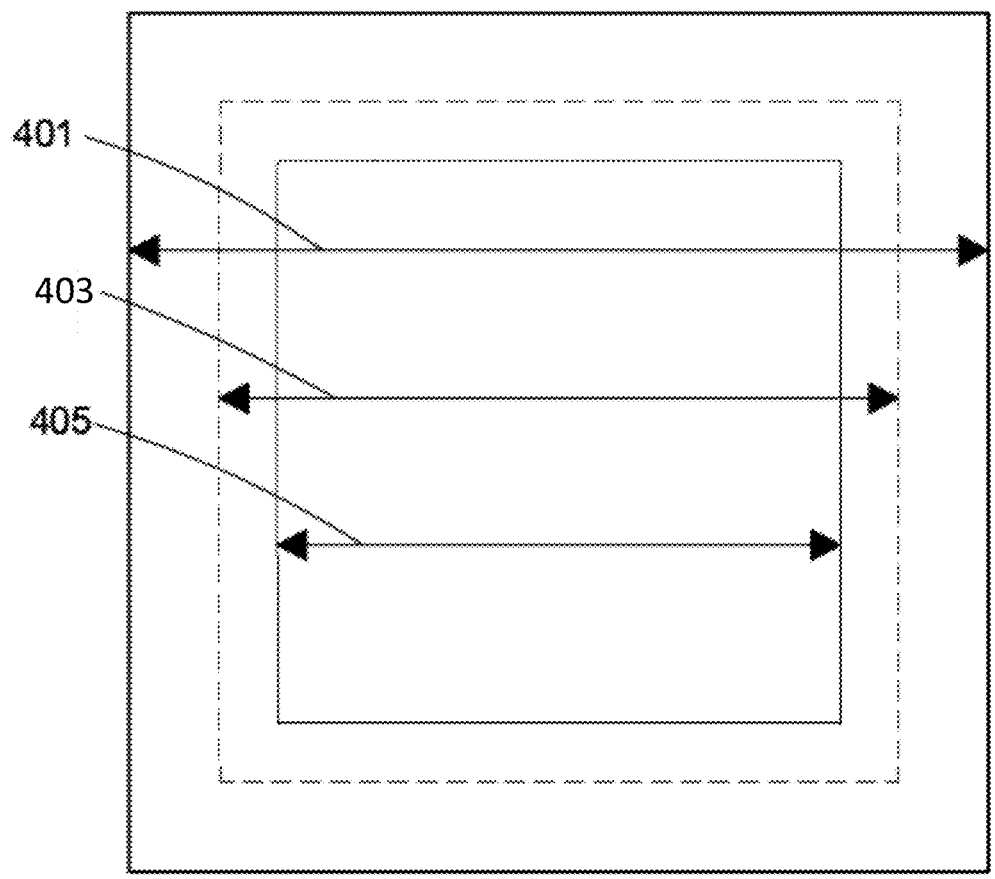
FIG. 4 is a schematic showing a prior art composite colour holographic reconstruction.

In prior systems, since the Fourier path length is the same for all of the colour channels, the hologram reconstruction as shown in FIG. 4 will result. FIG. 4 depicts a red holographic reconstruction 401, a green holographic reconstruction 403 and a blue holographic reconstruction 405 co-axially aligned at a reply plane.

The largest full colour image (the area where the red, green and blue images overlap) is limited by the size of the blue hologram reconstruction. This presents a further problem: it is desirable to calculate hologram reconstructions using a single computation engine. Ideally the same resolution would be calculated for each image, meaning the calculated hologram reconstructions for the red, green and blue images would have the same number of pixels. However, if this were the case, the resolution of each colour of the full colour image would be different, meaning, in the area of overlap where the full-colour image is formed, the number of image pixels for each colour hologram reconstruction would be different. For example:

Hologram Resolution $[X, Y] = 1024 \times 1024$.

Full Colour Area: Blue Resolution $[X, Y] = 1024$.

Full Colour Area: Green Resolution $[X, Y] =$
$$\frac{1024}{19.96 \text{ mm}} \cdot 16.88 \text{ mm} = 866$$

Full Colour Area: Red Resolution $[X, Y] = \frac{1024}{24.02 \text{ mm}} \cdot 16.88 \text{ mm} = 720$ It is undesirable for the individual wavelengths (colours) to have differing resolutions, in terms of number of pixels, within the full colour image area, as this leads to a degradation in image quality.

A solution is to vary the resolution of the computed hologram to ensure all colours have the same resolution with the full colour area.

In the present example, the resolution is determined as follows:

Full Colour Area: Blue Resolution $[X, Y] = 1024$.

Full Colour Area: Green Resolution $[X, Y] =$
$$\frac{1024}{16.88 \text{ mm}} \cdot 19.96 \text{ mm} = 1210$$

Full Colour Area: Red Resolution $[X, Y] = \frac{1024}{16.88 \text{ mm}} \cdot 24.02 \text{ mm} = 1458$ However, computationally, this is undesirable because the blue channel is a power of 2 number (i.e. $2^{10}=1024$) which is efficient to compute using an FFT. The Red and Green channels are no long power of 2 numbers and more importantly are significantly higher resolution. Given that the computation requirements of FFTs are logarithmic, any increase in resolution is undesirable.

The inventors have recognised that it is advantageous to use different Fourier path lengths for each colour channel. The different Fourier path lengths are determined by the use of corresponding Fourier transform lenses. For each colour channel, a different optical path from the Fourier transform lens to the replay plane may be realised by means of at least one corresponding optical element (e.g. mirror) to achieve the relevant Fourier path length.

Figure 5:
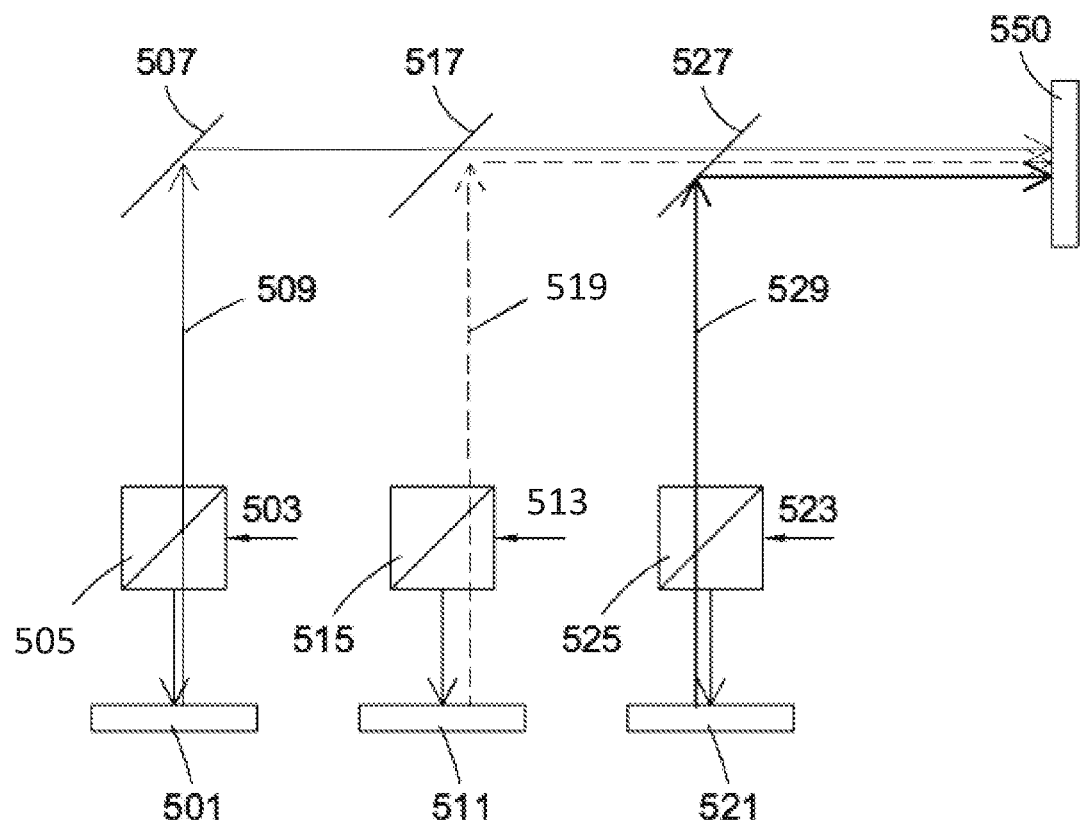
FIG. 5 shows a colour holographic display system.

FIG. 5 shows three Fourier paths of different length. FIG. 5 shows three colour channels by way of example only. The present disclosure is equally applicable to any plurality of light channels, such as two or four. The first colour channel comprises a first SLM 501 arranged to receive blue light 503 via a first beam splitter 505. The blue light is spatially modulated by the SLM 501. The phase-modulation provided by SLM 501 comprises an image component and a Fourier lensing component. The SLM 501 is reflective and the spatially-modulated light is directed to the replay plane 550 by a mirror 507. Optionally, the mirror 507 comprises an aperture to remove zero-order diffracted light from the SLM 510. Likewise, there is provided a green channel comprising a second SLM 511 arranged to receive green light 513 via a second beam splitter 515. The green light is spatially modulated by the second SLM 511. The phase-modulation provided by second SLM 511 comprises an image component and a Fourier lensing component. The second SLM 511 is reflective and the spatially-modulated light is directed to the replay plane 350 by a second mirror 317. Optionally, the second mirror 517 comprises an aperture to remove zero-order diffracted light from the second SLM 511. Further likewise, there is provided a red channel comprising a third SLM 521 arranged to receive red light 523 via a third beam splitter 525. The red light is spatially modulated by the third SLM 521. The phase-modulation provided by third SLM 521 comprises an image component and a Fourier lensing component. The third SLM 521 is reflective and the spatially-modulated light is directed to the replay plane 550 by a third mirror 527. Optionally, the third mirror 527 comprises an aperture to remove zero-order diffracted light from the third SLM 521. In some embodiments, a light-receiving surface, such as a screen or diffuser, is positioned at the replay plane 550.

In FIG. 5, the first optical path length 509 (for the blue channel) from SLM 501 to the replay plane 550 is greater than the second optical path length 519 (for the green channel) from second SLM 511 to the replay plane 550 which is in turn greater than the third optical path length 529 (for the red channel) from third RAI 521 to the replay plane 550. Each optical path length may be referred to as the "Fourier path length" for that channel because the Fourier lens is effectively on the SLM. It may therefore be understood that the Fourier path length is wavelength-dependent, optionally, inversely proportional to wavelength. Each Fourier path comprises a respective mirror, wherein at least one of the respective mirrors is a dichroic mirror. Each mirror receives light along a first part of the Fourier/optical path for the corresponding colour channel, and reflects light of the relevant channel wavelength along a second part of the Fourier/optical path for the colour channel towards the replay plane 550. Optionally, the plurality of mirrors 507, 517, 527 and replay plane 550 are disposed on a common optical path. Optionally, the plurality of mirrors and replay plane are collinear. In the embodiment of FIG. 5, spatial displacement of the optical paths is provided in the first part of the Fourier/optical paths for the different colour channels, whilst the second part of the Fourier/optical paths are substantially collinear.

The second mirror 517 is a dichroic mirror which is substantially reflective to green light but substantially transmissive to blue light. The third mirror 527 is a dichroic mirror which is substantially reflective to red light but substantially transmissive to green and blue light. The person skilled in the art is familiar with the use of dichroic coatings on mirrors to provide the functionality described. FIG. 5 describes blue, green and red channels by way of example only and the present disclosure is applicable to any plurality of different wavelength channels. It will be apparent that the first mirror 507 does not need to be a dichroic mirror.

In some embodiments, the device comprises two light channels and one dichroic mirror (or mirror with a dichroic coating). In other embodiments, the device comprises three light channels and two different dichroic mirrors (or mirrors with a dichroic coating). In some embodiments, the device comprises n light channels and (n-1) different dichroic mirrors (or mirrors with a dichroic coating). Again, the person skilled in the art will know how to provide the necessary dichroic mirror/s or different dichroic coatings on mirror/s to achieve the optical transmittance/reflectance described.

The use of (n-1) dichroic mirrors—where n is the number of light channels—allows the different colour channels to be directed onto a common optical axis to the replay plane 550. In particular, the colour channels are collinear in the region from the final mirror to the replay plane 550. The described use of at least one dichroic mirror therefore provides substantially collinear optical paths. Referring back to FIG. 5 by way of example, the second mirror 517 directs the green light onto a common optical path with the blue light and the third mirror 527 directs the red light onto said common optical path with the blue and green light.

The display device therefore comprises a collinear optical path for the plurality of colour channels, wherein the colour channels have different Fourier path lengths. This collinear optical path helps with optical alignment, stray light management and helps keep the device compact. Notably, the first mirror 507 of FIG. 5 may be independently aligned—that is without affecting the green and red light paths. When the blue light is aligned at the replay field 550 using the first mirror 507, the second mirror 517 may be aligned without affecting (e.g. misaligning or moving out of alignment) the blue light. Finally, the red light may then be aligned without affecting (e.g. misaligning or moving out of alignment) the blue or green light. There is therefore provided a device which is easier to align. There is also provided an improved method of aligning a display device having a plurality of colour channels.

The inventors have recognised that by forming the full colour image in this manner, the number of pixels in the image for each colour is constant, thereby enabling a common computation engine to be used for all three colour channels. Conveniently, the optical configuration, shown in FIG. 5, is advantageous from a packaging perspective as the need to mix colour channels requires dichroic mirrors to be spatially displaced and this spatial displacement may be used as part of the variable Fourier path lengths.

In embodiments, the wavelength-dependant path lengths may be determined as follows:

$$f(\lambda) = \frac{I[x,y]}{2 \cdot \tan\left(\sin^{-1}\left(\frac{\lambda}{2 \cdot p[x,y]}\right)\right)} \quad (2)$$

where f=Fourier path length, I=size of the holographic reconstruction, λ=wavelength of each colour channel and p=size of the pixel on the SLM.

For example, the Fourier path length (Fourier lens focal length [FL]) may be determined for each wavelength as follows:
I=30 mm
Red ($\lambda r$)=640 nm
Green ($\lambda g$)=532 nm
Blue ($\lambda b$)=450 nm
p[x,y]=8 um
This gives rise to three different sized hologram reconstructions:
Red FL=374.7 mm
Green FL=450.9 mm
Blue FL=533.1 mm In embodiments, there is therefore provided a full colour virtual image where the size of each individual colour image is the same. That is, it may therefore be understood that, in embodiments, the first optical path length and second optical path length are such that the first holographic reconstruction and second holographic reconstruction are the same size. The inventors have recognised that, advantageously, the first optical path length and second optical path length may be such that the first holographic reconstruction and second holographic reconstruction have the same resolution. In embodiments, the problem of the mismatch in physical size and the mismatch in resolution are simultaneously addressed.

It will be apparent that, in some embodiments, the first holographic reconstruction and second holographic reconstruction are coincident. Accordingly, a composite colour holographic reconstruction of a polychromic object may be provided. The first holographic reconstruction represents a first wavelength component of an object and the second holographic reconstruction represents a second wavelength component of the object. The present disclosure is not limited to Fourier holography but, in some embodiments, the first holographic data represents a first wavelength component of the object in the frequency domain and the second holographic data represents a second wavelength component of the object in the frequency domain.

The skilled person will readily understand that Equation 2 may be equally applied to different colours/wavelengths to determine different Fourier path lengths in accordance with the present disclosure. In embodiments, the first wavelength is red light, the second wavelength is green light and the third wavelength is blue light. That is, the first wavelength is a wavelength or range of wavelengths in the region (or band) of the electromagnetic spectrum corresponding to red light. Likewise, the second and third wavelengths are respective wavelengths or ranges of wavelengths in the region (or band) of the electromagnetic spectrum corresponding to green and blue light, respectively.

It may therefore be understood that, in embodiments, the first wavelength is greater than the second wavelength, which is greater than the third wavelength and the optical path length from the first Fourier transform lens to the replay plane is less than the optical path length from the second Fourier transform lens to the replay plane, which is less that the optical path length from the third Fourier transform lens to the replay plane.

In embodiments, the focal length of the Fourier transform lens is inversely proportional to the wavelength of the corresponding light. The Fourier lens may be a phase-only lens as forming part of the respective holographic data (i.e. hologram). The Fourier lens may be a physical optic.

Figure 8:
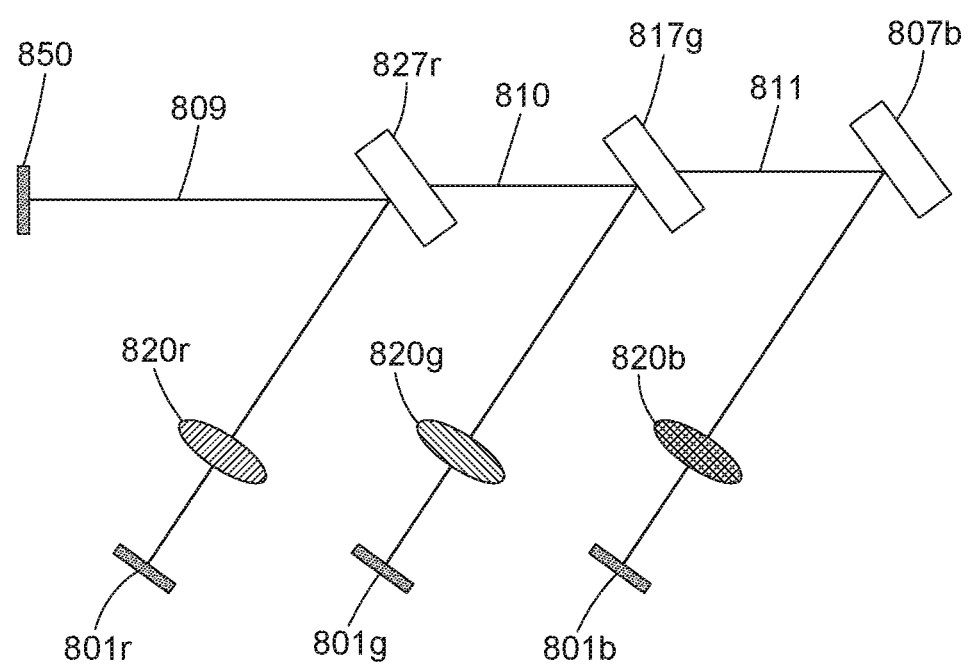
FIG. 8 shows a variation of the colour holographic display system of FIG. 5.

A variation of FIG. 5 is shown in FIG. 8. In this variation, SLMs for a plurality of colour channels are stacked in the x-direction or y-direction (i.e. side by side). Thus, the SLMs may be substantially co-located. In FIG. 8, each of the SLMs has an associated physical Fourier transform lens, and the length of the optical path from the Fourier lens to the replay plane is different for each colour channel. For each colour channel, the Fourier path is determined by a Fourier transform lens, and a mirror (or equivalent optical element) provides an optical path of the relevant Fourier path length. Thus, the arrangement of FIG. 8 may implement the above described SSC method.

In FIG. 8, blue, green and red light are directed onto respective first, second and third SLMs 801b, 801g, 801r, that are stacked side by side. As shown in FIG. 8, one or more of the first, second and third SLMs 801b, 801g, 801r may be inclined at an angle, although this is not essential. The blue, green and red light that is incident of the first, second and third SLMs 801b, 801g, 801r, respectively, may be from a corresponding monochromatic light source (not shown). The monochromatic light source may be a spatially coherent light source, such as a laser. Each of the SLMs is reflective and spatially-modulates the incident light as described above with reference to FIG. 5.

In FIG. 8, each colour channel includes a Fourier transform lens 820b, 820g, 820r associated with the corresponding SLM 801b, 801g, 801r. Each Fourier transform lens is physical optic. In other embodiments, one or more of the Fourier transform lenses could be a software lens or a combination of a physical lens and a software lens, as discussed above. Thus, for each colour channel, an optical path is provided between the Fourier lens and a replay field/replay plane 850, which corresponds to the Fourier path, as described above.

The Fourier transform lenses 820b, 820g, 820r receive spatially modulated blue, green and red light from the respective first, second and third SLMs 801b, 801g, 801r, for output along respective first, second and third optical/Fourier paths 809b, 809g and 809r to the replay field/replay plane 850. First, second and third mirrors 807b, 817g and 827r are disposed on the optical paths of the output blue, green and red light to provide different Fourier path lengths. As in FIG. 5, the plurality of mirrors 807b, 817g, 827r and replay plane 850 are substantially collinear along the second part of the respective first, second and third optical paths.

In particular, the spatially modulated blue, green and red light is output along respective first parts of the first, second and third optical paths 809b, 809g and 809r, and is reflected by the first, second and third mirrors 807b, 817g and 827r, respectively. As shown in FIG. 8, the first parts of the first, second and third optical paths 809b, 809g and 809r are parallel to each other, although this is not essential. The first, second and third mirrors 807b, 817g and 827r are arranged to reflect the output blue, green and red light, respectively, along a second part of the respective first, second and third optical paths 809b, 809g and 809r. in particular, the first, second and third mirrors 807b, 817g and 827r are substantially collinear with a common optical path 809 forming part of the second parts of the first, second and third optical paths 809b, 809g and 809r to the replay field/replay plane 850.

The first mirror 807b is located furthest away from the replay field/replay plane 850. The first mirror 807b receives the output blue light from the first part of the first optical path 809b, and reflects the blue light along a second part 811 of first optical path 809b towards the replay field/replay plane 850. In the embodiment of FIG. 8, the first and second parts of the first optical path 809b are arranged at an acute angle (i.e., less than 90°). The second mirror 817g is located in front of the first mirror 807b, closer to the replay field/replay plane 850. The second mirror 817g receives the output green light from the first part of the second optical path 809g, and reflects the output green light along a second part 810 of the second optical path 809g towards the replay field/replay plane 850. The second mirror 817g is substantially reflective to green light but substantially transmissive to blue light. Thus, the second mirror 817g transmits the blue light reflected by the first mirror 807b along the second part of the first optical path 809b towards the replay field/replay plane 850. In the embodiment of FIG. 8, the first and second parts of the second optical path 809g are arranged at an acute angle. The third mirror 827r is located in front of the first and second mirrors 807b, 817g, closest to the replay field/replay plane 850. The third mirror 827r receives the output red light from a first part of the third optical path 809r, and reflects the output red light along a second part of the third optical path 809r, corresponding to the common optical path 809, towards the replay field/replay plane 850. The third mirror 827r is substantially reflective to red light but substantially transmissive to blue and green light. Thus, the third mirror 827r transmits the green light reflected by the second mirror 817g along the second part of the second optical path 809g to the replay field/replay plane 850. Similarly, the third mirror 827r transmits blue light reflected by the first mirror 807b and transmitted by the second mirror 817g along the second part of the first optical path 809b. In the embodiment of FIG. 8, the first and second parts of the third optical path 809r are arranged at an acute angle. The, second and third mirrors 817g, 827r function like band pass filters, by transmitting selected wavelengths and reflecting other wavelengths. The second and third mirrors 817g, 827r may comprise dichroic mirrors, as described above, whilst the first mirror need not be dichroic or otherwise wavelength selective.

In FIG. 8, the first optical path length 809b (for the blue channel) is greater than the second optical path length 809g (for the green channel) which is in turn greater than the third optical path length 809r (for the red channel), where each optical path length is the distance from the respective Fourier transform lens 820 to the replay plane 850. The different Fourier path lengths for the respective blue, green and red channels enable the size (resolution) and position of the holographic reconstruction for each colour to be independently adjusted or "tuned" at the replay field/replay plane 850. Thus, for a full colour composite image, the size (resolution) and/or position of the respective blue, green and red holographic reconstructions are coincident. For other types of colour image, for example images that use a more limited colour gamut, the size (resolution) and position of the holographic reconstructions may be tuned to achieve any desired effect in the replay field.

In FIG. 8, spatial displacement of the optical paths is provided in the first part of the optical paths for the different colour channels, whilst the second part of the optical paths are substantially collinear. The first, second and third mirrors are disposed so that the angle between the first and second parts of the optical paths is less than 90°. In other words, for each colour channel, the angle of incidence (which corresponds to the angle of reflection) is less than 45°. This enables the SLMs to be located close to the replay field/replay plane for a more compact configuration.

As shown in FIG. 8, the first, second and third mirrors 807b, 817g and 827r are tilted at substantially the same angle so that the second parts of the first, second and third optical paths 809b, 809g, 809r have substantially the same direction, aligned with the common optical path 809, to the replay field/replay plane 850. The first, second and third mirrors 807b, 817g and 827r may be movable, for example towards and away from the replay field/replay plane 850 whilst maintaining the alignment, so as to adjust the corresponding holographic reconstruction at the replay field/replay plane 850. Optionally, one or more of the first, second and third mirrors 807b, 817g and 827r comprises an aperture to remove zero-order diffracted light from the SLM. In some embodiments, a light-receiving surface, such as a screen or diffuser, is positioned at the replay field/replay plane 850.

Figure 6:
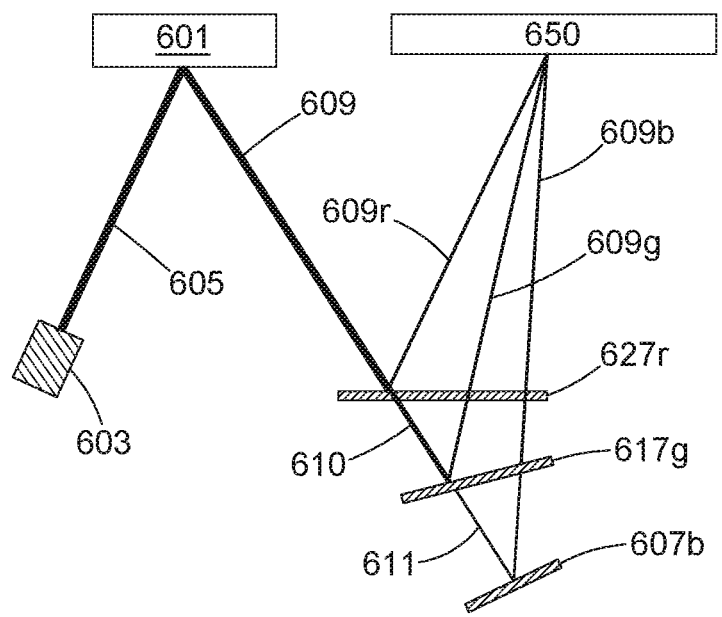
FIG. 6 shows a colour holographic display system in accordance with embodiments.

An embodiment is shown in FIG. 6 in which the Fourier path lengths are different. In this embodiment, a common SLM is used for each colour channel or a different SLM is used for each colour channel and the plurality of colour channels are substantially co-located. Thus, the embodiment of FIG. 6 may equally implemented using the above described SSC (spatially separated colours) and FSC (frame sequential colour) methods. The SLM/s and associated Fourier transform lenses may be provided in an integrated device. However, the length of the Fourier path to the replay plane is different for each colour channel. For each colour channel, the Fourier path is determined by a Fourier transform lens, and a mirror (or other optical element) provides an optical path of the relevant Fourier path length.

The embodiment of FIG. 6 comprises a common light source 603 that directs blue, green and red light 605 corresponding to first, second and third colour channels to a combined SLM 601. The light source 603 may comprise three colour lasers. The light source 603 may be used in combination with a suitable beam splitter, for example as described below with reference to FIGS. 7A and 7B or a FSC scheme may be implemented. FIG. 6 shows three colour channels by way of example only. The present disclosure is equally applicable to any plurality of light channels, such as two or four. SLM 601 may comprise a single SLM divided into three equal parts, acting, in effect, as three separate SLMs for the respective colour channels. For example, the single SLM could be divided into three parts using a different colour filter on each part. Alternatively, SLM 601 may comprise three separate, co-located SLMs, one for each of the three colour channels.

A Fourier transform lens (not shown in FIG. 6) may be associated with SLM 601 for each colour channel. The Fourier transform lens may comprise a physical optic, a software lens or a combination thereof, as discussed above. Thus, for each colour channel, an optical path between the Fourier transform lens associated with SLM 601 and a replay field/replay plane 650 corresponds to the Fourier path, as described above.

SLM 601 outputs spatially modulated blue, green and red light along respective first, second and third optical paths 609b, 609g and 609r to the replay field/replay plane 650. In FIG. 6, the replay field/replay plane 650 is substantially adjacent SLM 601, so as to provide a compact configuration. The replay field/replay plane 650 could equally be located in another position relative to SLM 601.

Optical elements comprising first, second and third mirrors 607b, 617g and 627r are disposed on the respective optical paths of the output blue, green and red spatially modulated light from the SLM 601 to provide different optical path lengths between SLM 601 and the replay field/replay plane 650. In particular, the spatially modulated blue, green and red light is output along a common optical path 609 and the colour components are individually reflected by the first, second and third mirrors 607b, 617g and 627r, respectively. The first, second and third mirrors 607b, 617g and 627r are aligned with the common optical path 609. Thus, each of the first, second and third optical paths 609b, 609g and 609r to the replay field/replay plane 650 has a first part, from SLM 601 to the respective first, second and third mirror 607b, 617g and 627r, that is collinear with the common optical path 609.

In particular, the first mirror 607b is located furthest away from SLM 601 and the replay field/replay plane 650. The first mirror 607b receives the spatially modulated blue light from a first part of the first optical path 609b, and reflects the blue light along a second part of first optical path 609b towards the replay field/replay plane 650. In the embodiment of FIG. 6, the first and second parts of the first optical path 609b are arranged at an acute angle (i.e., less than 90°), although this is not essential. The second mirror 617g is located in front of the first mirror 607b, closer to the SLM 601 and the replay field/replay plane 650. The second mirror 617g receives the spatially modulated blue and green light from a first part of each of the first and second optical paths 609b, 609g, and reflects the green light along a second part of the second optical path 609g towards the replay field/replay plane 650. The second mirror 617g is substantially reflective to green light and substantially transmissive to blue light. Thus, the blue light is transmitted along an optical path 611 forming part of the first part of the first optical path 609b, which is aligned with the common optical path 609, to the first mirror 607b. In the embodiment of FIG. 6, the first and second parts of the second optical path 609g are arranged at an acute angle, although this is not essential. The third mirror 627r is located in front of the first and second mirrors 607b, 617g, closest to SLM 601 and the replay field/replay plane 650. The third mirror 627r receives the spatially modulated blue, green and red light from a first part of each of the first, second and third optical paths 609b, 609g, 609r comprising the common optical path 609, and reflects the red light along a second part of the third optical path 609r towards the replay field/replay plane 650. The third mirror 627r is substantially reflective to red light and substantially transmissive to blue and green light. Thus, the third mirror 627r transmits the green light along the first part 609, 610 of the second optical path 609g to the second mirror 617g. Similarly, the third mirror 627r transmits blue light along the first part 609, 610, 611 of the first optical path 609b, which passes through the second mirror 617g to the first mirror 607b. In the embodiment of FIG. 6, the first and second parts of the third optical path 609r are arranged at an acute angle, although this is not essential. The second and third mirrors 617g, 627r function like band pass filters, by transmitting selected wavelengths and reflecting other wavelengths. The second and third mirrors 617g, 627r may comprise dichroic mirrors, as described above, whilst the first mirror need not be dichroic or otherwise wavelength selective.

In FIG. 6, the first optical path length 609b (for the blue channel) is greater than the second optical path length 609g (for the green channel) which is in turn greater than the third optical path length 609r (for the red channel). As before, each optical path length may be referred to as the "Fourier path length" for that channel because the Fourier lens is a software lends on the SW 601 in this embodiment. The different Fourier path lengths for the respective blue, green and red channels enables the size (resolution) and position of the holographic reconstruction for each colour to be independently adjusted or "tuned" in the replay field. Thus, for a full colour composite image, the size (resolution) and/or position of the respective blue, green and red holographic reconstructions are coincident. For other types of colour image, for example images that use a more limited colour gamut, the size and position of the holographic reconstructions may be adjusted to achieve any desired effect in the replay field/replay plane 650.

In the embodiment of FIG. 6, the distance from between SLM 601 and each of the first, second and third mirrors 607b, 617g and 627r is wavelength dependent. Similarly, the distance between the each of the first, second and third mirrors 607b, 617g and 627r and the replay field/replay plane 650 is wavelength dependent. Each mirror can be independently aligned with the replay field 650, that is without impacting the other mirror, as described above.

In contrast to the embodiments of FIGS. 5 and 8, in FIG. 6, spatial displacement of the optical paths is provided in the second part of the optical paths (i.e. from the corresponding mirror to the replay plane) for the different colour channels, whilst the first parts of the optical paths are substantially collinear.

In FIG. 6, the first, second and third mirrors 607b, 617g and 627r are disposed so that the angle between the first and second parts of the first, second and third optical paths 609b, 609g and 609r is less than 90°. In other words, for each colour channel, the angle of incidence (which corresponds to the angle of reflection) is less than 45°. In this way, the SLM 601 and the replay field/replay plane 650 can be positioned adjacent, or at least close, to each other for a compact configuration.

As shown in FIG. 6, the first, second and third mirrors 607b, 617g and 627r are tilted at different angles so that the second parts of the first, second and third optical paths 609b, 609g, 609r have different directions to the replay field/replay plane 650 for spatial displacement. One or more of the first, second and third mirrors 607b, 617g and 627r may be movable—such as slideable on a common axis—so as to independently adjust or "fine tune" the corresponding holographic reconstruction at the replay field/replay plane 650, for alignment of the images. For example, one or more of the first, second and third mirrors 607b, 617g and 627r may be moved linearly, whilst maintain the collinear alignment therebetween, so as to change the Fourier path length from the SLM 601 to the replay field/replay plane 650. Moreover, one or more of the first, second and third mirrors 607b, 617g and 627r may be moved to change the angle of tilt, so as to change the position of the corresponding holographic reconstruction on the replay plane 650. Optionally, one or more of the first, second and third mirrors 607b, 617g and 627r comprises an aperture to remove zero-order diffracted light from the SLM. In some embodiments, a light-receiving surface, such as a screen or diffuser, is positioned at the replay field/replay plane 650.

In FIG. 6, the configuration of the system comprising the substantially adjacent SLM 601 and replay field/replay plane 650, and the first, second and third mirrors 607b, 617g and 627r, enables independent-tuning and alignment of the images on the replay field/replay plane 650, in a smaller and more compact system. Thus, the system is more space efficient, and can be incorporated into a smaller overall package size. Furthermore, as well as being able to implement FSC (frame sequential colour) techniques, the system of FIG. 6 is able to implement SSC (spatially separated colours), whereby the or each SLM is illuminated with a respective one of the three colours at the same time, to achieve a brighter image. The quality of the image may be maintained by providing separate SLMs for each colour channel or providing a larger single SLM with more pixels to maintain image quality.

This collinear first part of the optical paths helps with optical alignment, stray light management and helps keep the device compact. Notably, the first mirror 607b of FIG. 6 may be independently aligned to adjust the blue light path, without affecting the green and red light paths. When the blue light is aligned at the replay field 550 using the first mirror 507, the second mirror 517 may be aligned without affecting (e.g. misaligning or moving out of alignment) the blue light. Finally, the red light may then be aligned without affecting (e.g. misaligning or moving out of alignment) the blue or green light.

Accordingly, a method of adjusting the display system of FIG. 6 is provided. The method starts with the display system, comprising SLM 601, first, second and third mirrors 607b, 617g and 627r and replay plane 650, requiring alignment so that the first, second and third holographic reconstructions are coincident. The first, second and third mirrors 607b, 617g and 627r are substantially collinear with a common optical path 609 for output light from SLM 601. The method comprises adjusting the position of the first mirror 607b, by linear movement towards or away from the SLM 601 along a line or axis parallel to the common optical path 609 (e.g. the line of the first part of the third optical path 609b), to form the first holographic reconstruction at the replay plane 650. The method further comprises adjusting the position of the second mirror 617g, by linear movement towards or away from the SLM 601 along a line or axis parallel to the common optical path 609 (e.g. the line of the first part of the second optical path 609g), to form the second holographic reconstruction, coincident with the first holographic reconstruction, at the replay plane 650. The method additionally comprises adjusting the position of the third mirror 627r, by linear movement towards or away from the SLM 601 along the line or axis of the common optical path 609, to form the third holographic reconstruction, coincident with the first and second holographic reconstructions, at the replay plane 650. Since the linear movement of each mirror does not affect the alignment of the other mirrors, the size (resolution) and/or position of each holographic reconstruction can be independently adjusted to match the other holographic reconstructions, as desired.

In embodiments, the method may also comprise adjusting an orientation of one or more of the first, second and third mirrors 607b, 617g and 627r. This further enables fine adjustment of the position of the relevant holographic reconstruction at the replay plane 650.

Figure 7A:
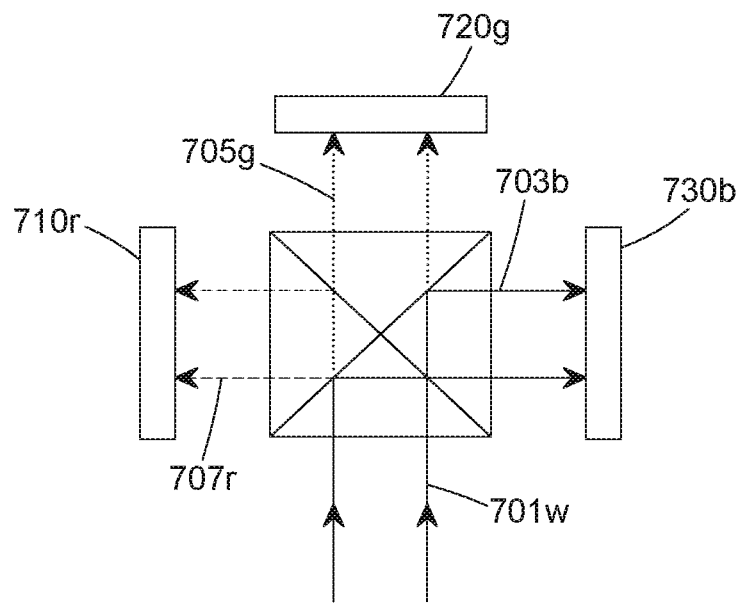
FIG. 7A shows illumination of three reflective SLMs, corresponding to three colour channels, for use in a colour holographic display.
Figure 7B:
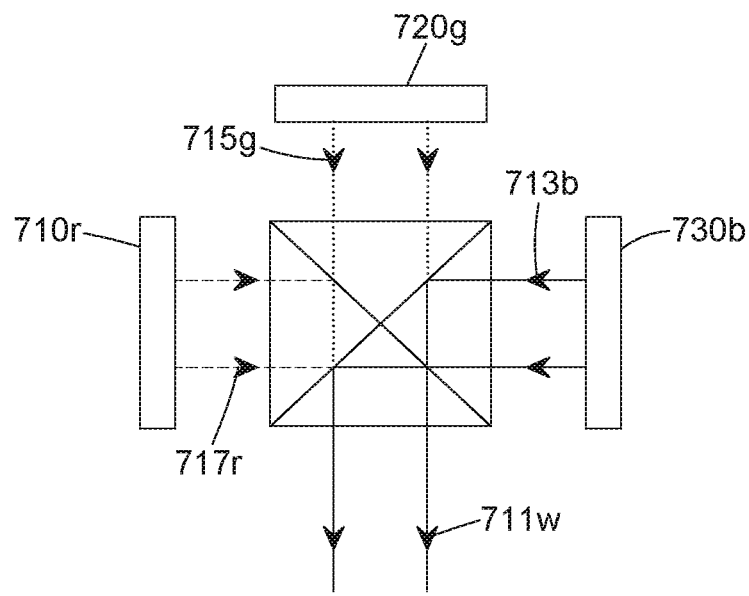
FIG. 7B shows recombination of holographically encoded light from the reflective SLM corresponding to each of the three colour channels shown in FIG. 7A.

FIGS. 7A and 7B show example arrangements for implementing SSC in embodiments, such as the embodiment of FIG. 6.

FIG. 7A shows an example of how to provide an SSC scheme using the optical configuration of FIG. 6. In particular, there is provided an x-cube prism comprising a glass cube beam splitter with a coating on each diagonal, to respectively reflect blue and red light so as to output blue, green and red light channels. In the embodiment of FIG. 6, the x-cube prism may be provided within SLM 601 as an integrated SLM device, although this is not essential. As shown in FIG. 7A, incident light 701w comprising collinear red, green and blue light is input to a first face of the cube prism. The red component of the incident light 701w is reflected by diagonal red light-reflecting coating and output as red light 707r from a second face (to the left of the first face) of the cube to SLM 710r. The green component of the incident light 701w passes straight through the cube, without reflection, and is output as green light 705g from a fourth face (opposite the first face) of the cube to SLM 720g. Finally, the blue component of the incident light 701w is reflected by the other diagonal blue-reflecting coating and output as blue light 703*b* from a third face (to the right of the first face) of the cube to SLM 730*b*.

FIG. 7B shows an example of how spatially modulated blue, green and red light from the SLMs 710*r*, 720*g* and 730*b* may be recombined and output to the replay field/replay plane 650. In particular, the spatially modulated blue, green and red light 713*b*, 715*g* and 717*r* may be incident on respective faces of the x-cube prism, and light 711*w* combining blue, green and red components of the spatially modulated blue, green and red light 713*b*, 715*g* and 717*r* may be output at a fourth face. The x-cube prism of FIG. 7B thus performs the reverse operation of x-cube prism of FIG. 7A, as described above. Thus, the same x-cube prism is used for both the splitting and recombining operations of FIGS. 7A and 7B, respectively. The blue, green and red light 713*b*, 715*g* and 717*r* is pulsed on and off in order to temporally separate the splitting and recombining operations. Use of a beam splitter and recombiner, such as the x-cube prism described above, in embodiments such the embodiment of FIG. 6, enables a simple solution for SSC.

As will be appreciated from the above description, in the configuration shown in FIGS. 6, the SLMs for the three colour channels may be co-located. In addition, the first parts of the optical paths for the three colour channels are substantially collinear (aligned with common optical path 609), where the total Fourier/optical path length for each colour channel is different. The three colour channels are combined in the replay field at the replay plane 650. For each colour channel, the corresponding mirror reflects the corresponding light along a second part of the optical path. This enables the SLM 601 and replay plane 605 to be positioned substantially adjacent, or at least close, to each other. The mirrors are collinear with the common optical path 609. Thus, the mirrors so can be moved back and forth with respect to each other, whilst maintaining the alignment therebetween, for convenient adjustment of the holographic reconstructions at the replay plane 650. Accordingly, the configuration of FIG. 6 enables independent-tuning and alignment of the replay image at the replay field/replay plane in a smaller and more compact system. Thus, the system is more space efficient, and can be incorporated into a smaller overall package size. Furthermore, as well as being able to implement FSC (frame sequential colour) techniques, the system of FIG. 6 is able to implement SSC (spatially separated colours), whereby the SLMs are illuminated with their respective colours at the same time, to achieve a brighter image.

Additional Features

The disclosed embodiments refer to an electrically-activated LCOS spatial light modulator by way of example only. The teachings of the present disclosure may equally be implemented on any spatial light modulator capable of displaying a computer-generated hologram in accordance with the present disclosure such as any electrically-activated SLMs, optically-activated SLM, digital micromirror device or microelectromechanical device, for example.

The colour display system of the present disclosure may be used to provide an improved head-up display (HUD) or head-mounted display. In some embodiments, there is provided a vehicle comprising the colour display system installed in the vehicle to provide a HUD. The vehicle may be an automotive vehicle such as a car, truck, van, lorry, motorcycle, train, airplane, boat, or ship.

In some embodiments, the size (number of pixels in each direction) of the hologram is equal to the size of the spatial light modulator so that the hologram fills the spatial light modulator. That is, the hologram uses all the pixels of the spatial light modulator. In other embodiments, the size of the hologram is less than the size of the spatial light modulator. In some of these other embodiments, part of the hologram (that is, a continuous subset of the pixels of the hologram) is repeated in the unused pixels. This technique may be referred to as "tiling" wherein the surface area of the spatial light modulator is divided up into a number of "tiles", each of which represents at least a subset of the hologram. Each tile is therefore of a smaller size than the spatial light modulator.

The size of the holographic replay field (i.e. the physical or spatial extent of the holographic reconstruction) is determined by the pixel spacing of the spatial light modulator (i.e. the distance between adjacent light-modulating elements, or pixels, of the spatial light modulator). The smallest feature which may be formed in the replay field may be called a "resolution element", "image spot" or an "image pixel". Typically, each pixel of the spatial light modulator has a quadrangular shape. The Fourier transform of a quadrangular aperture is a sinc function and therefore each image pixel is a sinc function. More specifically, the spatial intensity distribution of each image pixel on the replay field is a sinc function. Each sinc function may be considered as comprising a peak-intensity primary diffractive order and a series of decreasing-intensity higher diffractive orders extending radially away from the primary order. The size of each sinc function (i.e the physical or spatial extent of each sinc function) is determined by the size of the spatial light modulator (i.e. the physical or spatial extent of the aperture formed by the array of light-modulating elements or spatial light modulator pixels). Specifically, the larger the aperture formed by the array of light-modulating pixels, the smaller the image pixels. It is usually desirable to have small image pixels.

In some embodiments, the technique of "tiling" is implemented to increase image quality. Specifically, some embodiments implement the technique of tiling to minimise the size of the image pixels whilst maximising the amount of signal content going into the holographic reconstruction.

In some embodiments, the holographic pattern written to the spatial light modulator comprises at least one whole tile (that is, the complete hologram) and at least one fraction of a tile (that is, a continuous subset of pixels of the hologram).

The holographic reconstruction is created within the zeroth diffraction order of the overall window defined by the spatial light modulator. It is preferred that the first and subsequent orders are displaced far enough so as not to overlap with the image and so that they may be blocked using a spatial filter.

In embodiments, such as FIG. 8, the first and/or second Fourier transform lens is a physical optic. In these embodiments in particular, the zero-order removal apertures described may optionally be included on the mirrors and optical power added to the holographic data such that the corresponding holographic reconstruction and zero-order light are brought to a focus at different planes on the optical path.

In other embodiments, such as FIG. 6, the first and/or second Fourier transform lens is lensing data of the first/second holographic data. That is, the first and/or second holographic data comprises an image component and a lensing component, wherein the lensing component is the first and/or second Fourier transform lens. In embodiments in which the Fourier transform lens is computationally provided on the SLM, it may be understood that the lensing data is software-defined.

In further advantageous embodiments, one of the first and second Fourier transform lenses is a physical optic and the other of the first and second Fourier transform lenses is lensing data of the second holographic data.

In embodiments, a zero-order removal element is provided for one or more of the colour channels. The zero-order removal element may be considered a spatial filter. Advantageously, removal of the zero-order light increases the signal-to-noise ratio of the holographic reconstruction. In embodiments, the system therefore further comprising a first spatial filter on the optical path from the first Fourier transform lens to the replay plane arranged to prevent zero-order diffracted light of the first wavelength reaching the replay plane and/or a second spatial filter on the optical path from the second Fourier transform lens to the replay plane arranged to prevent zero-order diffracted light of the second wavelength reaching the replay plane.

In embodiments, the first and/or second spatial filter is/are incorporated on the or a respective dichroic mirror and comprises a first portion arranged to provide (or direct) the zero-order diffracted light on a first optical path and a second portion arranged to provide (or direct) the higher-order diffracted light on a second optical path. In embodiments, the first portion is an aperture and the second portion is a reflection (or reflective) portion.

In embodiments, the display system further comprises a first light source arranged to illuminate the first plurality of pixels with light of the first wavelength and a second light source arranged to illuminate the second plurality of pixels with light of the second wavelength. In embodiments, the light sources are substantially monochromatic. In embodiments, the light sources are (spatially) coherent light sources such as lasers. In other embodiments, the display system may not include a light source, but, instead, may be operated using one or more external light sources.

It may be understood that the present teachings may be extended to more than two colour channels. In embodiments, red, green and blue colour channels are provided to produce a colour holographic reconstruction, further colour channels may be added for example red, green, yellow and blue.

In embodiments, the display system therefore further comprises a third plurality of pixels arranged to display a third hologram. The third plurality of pixels is arranged to receive light of a third wavelength and output light of the third wavelength, spatially-modulated according to the third hologram, along a third optical path. The third optical path has a third Fourier transform lens for forming a third holographic reconstruction, corresponding to the third hologram, at the replay plane. A third optical element is provided on the third optical path between the third Fourier transform lens and the replay plane. The third optical element is arranged to receive the output/spatially modulated light of the third wavelength from a first part of the third optical path and direct the light of the third wavelength along a second part of the third optical path to the replay plane. The first part of the third optical path is substantially collinear with the first part of the first optical path and the first part of the second optical path. The length of the third optical path between the third Fourier transform lens and the replay plane is not equal to the length of the first optical path between the first Fourier transform lens and the replay plane or second optical path between the second Fourier transform lens and the replay plane In embodiments, the first holographic reconstruction, second holographic reconstruction and third holographic reconstruction are coincident. Accordingly, a high-quality colour holographic reconstruction is achieved.

It may therefore be understood that in embodiments comprising three colour channels, the first optical path length, second optical path length and third optical path length are such that the first holographic reconstruction, second holographic reconstruction and third holographic reconstruction are the same size and have the same resolution.. In embodiments, the first wavelength corresponds to blue light, the second wavelength corresponds to green light and the third wavelength corresponds to red light.

In the disclosed embodiments, each colour channel includes a mirror, to redirect light on the first part of the corresponding optical path to the second part of the optical path, for spatial displacement of the optical paths for the different colour channels. It may be understood that other types of optical element may be used to redirect light for each colour channel, such as prisms.

In embodiments, each holographic reconstruction is one frame of a sequence of 2D video frames. In embodiments, the replay plane is spatially remote from a viewer. That is, the replay field is presented as a virtual image Examples describe illuminating the SLM with visible light but the skilled person will understand that the light sources and SLM may equally be used to direct infrared or ultraviolet light, for example, as disclosed herein. For example, the skilled person will be aware of techniques for converting infrared and ultraviolet light into visible light for the purpose of providing the information to a user. For example, the present disclosure extends to using phosphors and/or quantum dot technology for this purpose.

Some embodiments describe 2D holographic reconstructions by way of example only. In other embodiments, the holographic reconstruction is a 3D holographic reconstruction. That is, in some embodiments, each computer-generated hologram forms a 3D holographic reconstruction.

The methods and processes described herein may be embodied on a computer-readable medium. The term "computer-readable medium" includes a medium arranged to store data temporarily or permanently such as random-access memory (RAM), read-only memory (ROM), buffer memory, flash memory, and cache memory. The term "computer-readable medium" shall also be taken to include any medium, or combination of multiple media, that is capable of storing instructions for execution by a machine such that the instructions, when executed by one or more processors, cause the machine to perform any one or more of the methodologies described herein, in whole or in part.

The term "computer-readable medium" also encompasses cloud-based storage systems. The term "computer-readable medium" includes, but is not limited to, one or more tangible and non-transitory data repositories (e.g., data volumes) in the example form of a solid-state memory chip, an optical disc, a magnetic disc, or any suitable combination thereof. In some example embodiments, the instructions for execution may be communicated by a carrier medium. Examples of such a carrier medium include a transient medium (e.g., a propagating signal that communicates instructions).

The described display system comprises a colour display system with three primary colour channels, that displays a composite polychromatic image by overlapping corresponding monochromatic holographic reconstructions for each colour channel. The present disclosure is equally applicable to a colour display system with just two colour channels, or more than three colour channels. Furthermore, the present disclosure is also applicable to a display system with two or more colour channels, that displays corresponding monochromatic images in different non-overlapping parts of the replay plane.

It will be apparent to those skilled in the art that various modifications and variations can be made without departing from the scope of the appended claims. The present disclosure covers all modifications and variations within the scope of the appended claims and their equivalents.

The invention claimed is:

1. A display system comprising:
a light source configured to provide light of at least a first wavelength and light of a second wavelength;
one or more spatial light modulators including at least a first plurality of pixels and a second plurality of pixels, the first plurality of pixels being arranged to
be written with a first holographic data set and first focusing lensing data,
receive the light of the first wavelength from the light source, and
output along a first optical path the light of the first wavelength that is spatially-modulated according to the first holographic data set and the first focusing lensing data,
the first focusing lensing data being configured to cause formation of a first holographic reconstruction, corresponding to the first holographic data set, from the light of the first wavelength at a replay plane, and
the second plurality of pixels being arranged to
be written with a second holographic data set and second focusing lensing data,
receive the light of the second wavelength from the light source, and
output along a second optical path the light of the second wavelength that is spatially-modulated according to the second holographic data set and the second focusing lensing data,
the second focusing lensing data being configured to cause formation of a second holographic reconstruction, corresponding to the second hologram, from the light of the second wavelength at the replay plane;
a first optical element on the first optical path between the first plurality of pixels and the replay plane, wherein the first optical element is arranged to receive the light of the first wavelength from a first part of the first optical path and direct the light of the first wavelength along a second part of the first optical path to the replay plane; and
a second optical element on the second optical path between the second plurality of pixels and the replay plane, wherein the second optical element is arranged to receive the modulated light of the second wavelength from a first part of the second optical path and direct the light of the second wavelength along a second part of the second optical path to the replay plane, the first part of the second optical path being substantially collinear with the first part of the first optical path,
wherein the length of the second optical path between the second plurality of pixels and the replay plane is not equal to the length of the first optical path between the first plurality of pixels and the replay plane, and
wherein the length of the first part of the first optical path is not equal to the length of the first part of the second optical path.

2. The display system of claim 1 wherein the first wavelength is less than the second wavelength, and the length of the first optical path between the first plurality of pixels and the replay plane is greater that the length of the second optical path between the second plurality of pixels and the replay plane.

3. The display system of claim 1 wherein the second optical element comprises a wavelength-selective mirror for reflecting the light of the second wavelength and transmitting the light of the first wavelength.

4. The display system of claim 1 wherein the length of the first part of the first optical path is greater than the length of the first part of the second optical path.

5. The display system of claim 1, wherein the second optical element is arranged to receive the substantially collinear first part of the first and second optical paths, and to transmit the light of the first wavelength along the first optical path to the first optical element, whilst directing the light of the second wavelength along the second part of the second optical path.

6. The display system of claim 1 wherein the first optical element is arranged to direct the light of the first wavelength along the second part of the first optical path to the replay plane, and the second optical element is arranged to direct the light of the second wavelength along the second part of the second optical path to the replay plane such that the first holographic reconstruction and the second holographic reconstruction are substantially coincident.

7. The display system of claim 1 wherein the first holographic reconstruction has a first full frame area, and the second holographic reconstruction has a second full frame area, and wherein the first and second optical elements are arranged so that the respective lengths of the first and second optical paths are such that the first and second holographic reconstructions have substantially the same resolution within the smaller of the first full-frame area and the second full frame area.

8. The display system of claim 1, wherein:
the light source is configured to provide light of a third wavelength;
the one or more spatial light modulators include a third plurality of pixels arranged to
be written with third holographic data set and third focusing lensing data,
receive the light of the third wavelength from the light source, and
output along a third optical path the light of the third wavelength that is spatially-modulated according to the third holographic data set and the third focusing lensing data,
the third focusing lensing data being configured to cause formation of a third holographic reconstruction corresponding to the third holographic data set from the light of the third wavelength at the replay plane;
the display system further comprises a third optical element on the third optical path between the third plurality of pixels and the replay plane, wherein the third optical element is arranged to receive the light of the third wavelength from a first part of the third optical path and direct the light of the third wavelength along a second part of the third optical path to the replay plane;
the length of the third optical path between the third plurality of pixels and the replay plane is not equal to the length of the first optical path between the first plurality of pixels and the replay plane and/or second optical path between the second plurality of pixels and the replay plane; and the length of the first part of the third optical path is not equal to the length of the first part of the second optical path and/or the first part of the first optical path.

9. The display system as claimed in claim 8 wherein the first part of the third optical path is substantially collinear with the first part of the first optical path and the first part of the second optical path.

10. The display system of claim 9 wherein
the first wavelength is less than the second wavelength and the third wavelength is less than the second wavelength, and
wherein the length of the first optical path between the first plurality of pixels and the replay plane is greater than the length of the second optical path between the second plurality of pixels and the replay plane, and the length of the second optical path between the second plurality of pixels and the replay plane is greater that the length of third optical path between the third plurality of pixels and the replay plane.

11. The display system of claim 9 wherein:
the third optical element is arranged to receive the first part of each of the first, second and third optical paths, and to transmit the light of the first and second wavelengths along the first and second optical paths to the respective first and second optical elements, whilst directing the light of the third wavelength along the second part of the third optical path, and
the second optical element is arranged to receive the light of the first and second wavelengths from the third optical element and to transmit the light of the first wavelength along the first optical path to the first optical element, whilst directing the light of the second wavelength along the second part of the second optical path.

12. A method of adjusting the display system of claim 8, the method comprising:
adjusting the position of the first optical element, to form the first holographic reconstruction at the replay plane, comprising linear movement of the first optical element towards or away from the first plurality of pixels along an axis substantially parallel to the first part of the first optical path;
adjusting the position of the second optical element to form the second holographic reconstruction at the replay plane, comprising linear movement of the second optical element towards or away from the second plurality of pixels along an axis substantially parallel to the first part of the second optical path so that the second holographic reconstruction matches the first holographic reconstruction in position, wherein the first holographic reconstruction has a first full frame area, and the second holographic reconstruction has a second full frame area matching the first full frame area, and wherein the first and second optical elements are adjusted so that the respective lengths of the first and second optical paths are such that the first and second holographic reconstructions have substantially the same resolution within the first full-frame area and the second full frame area, and
adjusting the position of the third optical element to form the third holographic reconstruction at the replay plane, comprising linear movement of the third optical element towards or away from the third plurality of pixels along an axis substantially parallel to the first part of the third optical path so that the third holographic reconstruction matches the first and second holographic reconstructions in position, wherein the third holographic reconstruction has a third full frame area matching the first full frame area, and wherein the first and third optical elements are adjusted so that the respective lengths of the first and third optical paths are such that the first and third holographic reconstructions have substantially the same resolution within the first full-frame area and the third full frame area.

13. The method of claim 12, further comprising:
adjusting the orientation of one or more of the first, second and third optical elements.

14. A display system comprising:
a light source configured to provide light of at least a first wavelength and light of a second wavelength;
one or more spatial light modulators including at least a first plurality of pixels and a second plurality of pixels,
the first plurality of pixels being arranged to
be written with first holographic data set and first focusing lensing data,
receive the light of the first wavelength from the light source, and
output along a first optical path the light of the first wavelength that is spatially-modulated according to the first holographic data set and the first focusing lensing data,
the first focusing lensing data being configured to cause formation of a first holographic reconstruction, corresponding to the first holographic data set, from the light of the first wavelength at a replay plane, and
the second plurality of pixels being arranged to
be written with a second holographic data set and second focusing lensing data,
receive the light of the second wavelength from the light source, and
output along a second optical path the light of the second wavelength that is spatially-modulated according to the second holographic data set and the second focusing lensing data,
the second focusing lensing data being configured to cause formation of a second holographic reconstruction, corresponding to the second hologram, from the light of the second wavelength at the replay plane;
a first optical element on the first optical path between the first plurality of pixels and the replay plane, wherein the first optical element is arranged to receive the light of the first wavelength from a first part of the first optical path and direct the light of the first wavelength along a second part of the first optical path to the replay plane; and
a second optical element on the second optical path between the second plurality of pixels and the replay plane, wherein the second optical element is arranged to receive the light of the second wavelength from a first part of the second optical path and direct the light of the second wavelength along a second part of the second optical path to the replay plane,
wherein the length of the second optical path between the second plurality of pixels and the replay plane is not equal to the length of the first optical path between the first plurality of pixels and the replay plane,
wherein the length of the first part of the first optical path is not equal to the length of the first part of the second optical path, and
wherein a direction of the second part of the first optical path is different from a direction of the second part of the second optical path.

15. A display system comprising:
a light source configured to provide light of at least a first wavelength and light of a second wavelength;
one or more spatial light modulators including at least a first plurality of pixels and a second plurality of pixels, the first plurality of pixels being arranged to
be written with first holographic data set and first focusing lensing data,
receive light of the first wavelength from the light source, and
output along a first optical path light of the first wavelength that is spatially-modulated according to the first holographic data set and the first focusing lensing data,
the first focusing lensing data being configured to cause formation of a first holographic reconstruction, corresponding to the first holographic data set, from the light of the first wavelength at a replay plane, and
the second plurality of pixels being arranged to
be written with a second holographic data set and second focusing lensing data,
receive the light of the second wavelength from the light source, and
output along a second optical path the light of the second wavelength that is spatially-modulated according to the second holographic data set and the second focusing lensing data,
the second focusing lensing data being configured to cause formation of a second holographic reconstruction, corresponding to the second hologram, from the light of the second wavelength at the replay plane;
a first optical element on the first optical path between the first plurality of pixels and the replay plane, wherein the first optical element is arranged to receive the light of the first wavelength from a first part of the first optical path and direct the light of the first wavelength along a second part of the first optical path to the replay plane; and
a second optical element on the second optical path between the second plurality of pixels and the replay plane, wherein the second optical element is arranged to receive the light of the second wavelength from a first part of the second optical path and direct the light of the second wavelength along a second part of the second optical path to the replay plane,
wherein the length of the second optical path between the second plurality of pixels and the replay plane is not equal to the length of the first optical path between the first plurality of pixels and the replay plane,
wherein the length of the first part of the first optical path is not equal to the length of the first part of the second optical path, and
wherein the first optical element comprises a first mirror and the second optical element comprises a second mirror, wherein the first mirror is oriented at a different angle to the second mirror.

16. A method of displaying an image comprising
providing light of a first wavelength and light of a second wavelength from a light source;
writing a first holographic data set and first focusing lensing data on a first plurality of pixels of one or more spatial light modulators;
receiving the light of the first wavelength from the light source at the first plurality of pixels and outputting along a first optical path the light of the first wavelength that is spatially modulated according to the first holographic data set;
causing, via the first set of pixels written with the first focusing lensing data, the light of the first wavelength to form a first holographic reconstruction corresponding to the first holographic data set at a replay plane, wherein
the forming the first holographic reconstruction at the replay plane includes transmitting the light of the first wavelength from the first plurality of pixels along a first part of the first optical path to a first optical element, and directing the light of the first wavelength with the first optical element along a second part of the first optical path to the replay plane;
writing a second holographic data set and second focusing lensing data on a second plurality of pixels of the one or more spatial light modulators;
receiving the light of the second wavelength from the light source at the second plurality of pixels and outputting from the second plurality of pixels along a second optical path the light of the second wavelength that is spatially modulated according to the second holographic data set; and
causing, via the second set of pixels written with the second focusing lensing data, the light of the second wavelength to form a second holographic reconstruction corresponding to the second holographic data set at the replay plane,
wherein the forming the second holographic reconstruction at the replay plane includes transmitting the light of the second wavelength from the second plurality of pixels along a first part of the second optical path to a second optical element, and directing the light of the second wavelength with the second optical element along a second part of the second optical path to the replay plane, and
wherein the first part of the second optical path is substantially collinear with the first part of the first optical path,
wherein the length of the second optical path between the second plurality of pixels and the replay plane is not equal to the length of the first optical path between the first plurality of pixels and the replay plane, and
wherein the length of the first part of the first optical path is not equal to the length of the first part of the second optical path.

17. The method according to claim 16, wherein the directing of the light of the first wavelength and the directing of the light of the second wavelength are performed so that the second holographic reconstruction matches the first holographic reconstruction in position, and wherein the first holographic reconstruction has a first full frame area, and the second holographic reconstruction has a second full frame area matching the first full frame area, and wherein the first and second optical elements are adjusted so that the respective lengths of the first and second optical paths are such that the first and second holographic reconstructions have substantially the same resolution within the first full-frame area of and the second full frame area.

18. The method of claim 16, wherein
the directing of the light of the first wavelength and the directing of the light of the second wavelength are performed so that the second holographic reconstruction matches the first holographic reconstruction in position, wherein the first holographic reconstruction has a first full frame area, and the second holographic reconstruction has a second full frame area matching the first full frame area, and wherein the first and second optical elements are adjusted so that the respective lengths of the first and second optical paths are such that the first and second holographic reconstructions have substantially the same resolution within the first full-frame area and the second full frame area;

the directing of the light of the first wavelength is performed with a first optical element that is a first mirror and the directing of the light of the second wavelength is performed with a second optical element that is a second mirror; and the second optical element receives a substantially collinear first part of the first and second optical paths, and transmits the light of the first wavelength along the first optical path to the first optical element, whilst directing the light of the second wavelength along the second part of the second optical path, the method further comprising:

adjusting the position of the first optical element, to form the first holographic reconstruction at the replay plane, comprising linear movement of the first optical element towards or away from the first plurality of pixels along an axis substantially parallel to the first part of the first optical path; and adjusting the position of the second optical element to form the second holographic reconstruction at the replay plane, comprising linear movement of the second optical element towards or away from the second plurality of pixels along an axis substantially parallel to the first part of the second optical path so that the second holographic reconstruction matches the first holographic reconstruction in position, wherein the first holographic reconstruction has a first full frame area, and the second holographic reconstruction has a second full frame area matching the first full frame area, and wherein the first and second optical elements are adjusted so that the respective lengths of the first and second optical paths are such that the first and second holographic reconstructions have substantially the same resolution within the first full-frame area and the second full frame area.

\* \* \* \* \*